(12) United States Patent
Ueda et al.

(10) Patent No.: US 11,762,359 B2
(45) Date of Patent: Sep. 19, 2023

(54) SLAVE APPARATUS, CONTROL METHOD OF SLAVE APPARATUS, MASTER-SLAVE CONTROL SYSTEM, AND RECORDING MEDIUM THAT RECORDS INFORMATION PROCESSING PROGRAM

(71) Applicant: OMRON Corporation, Kyoto (JP)

(72) Inventors: Takamasa Ueda, Kusatsu (JP); Yasuo Muneta, Kusatsu (JP); Keisaku Kikuchi, Kusatsu (JP); Toru Murata, Kyoto (JP)

(73) Assignee: OMRON Corporation, Kyoto (JP)

( * ) Notice: Subject to any disclaimer, the term of this patent is extended or adjusted under 35 U.S.C. 154(b) by 598 days.

(21) Appl. No.: 16/470,542

(22) PCT Filed: Oct. 18, 2017

(86) PCT No.: PCT/JP2017/037729
§ 371 (c)(1),
(2) Date: Jun. 17, 2019

(87) PCT Pub. No.: WO2018/138984
PCT Pub. Date: Aug. 2, 2018

(65) Prior Publication Data
US 2020/0089181 A1    Mar. 19, 2020

(30) Foreign Application Priority Data

Jan. 27, 2017   (JP) ................................ 2017-013540

(51) Int. Cl.
*G05B 19/042*   (2006.01)
(52) U.S. Cl.
CPC .. *G05B 19/0428* (2013.01); *G05B 2219/2231* (2013.01); *G05B 2219/24024* (2013.01)

(58) Field of Classification Search
CPC ........ G05B 19/0428; G05B 2219/2231; G05B 2219/24024
See application file for complete search history.

(56) References Cited

U.S. PATENT DOCUMENTS

2004/0210326 A1* 10/2004 Muneta ................ G05B 19/058
700/82
2008/0046603 A1* 2/2008 Kobayashi ............ G06F 11/364
710/17

(Continued)

FOREIGN PATENT DOCUMENTS

CN         1396498      2/2003
CN       101355482      1/2009

(Continued)

OTHER PUBLICATIONS

"Office Action of Japan Counterpart Application" with English translation thereof, dated May 25, 2021, p. 1-p. 6.

(Continued)

*Primary Examiner* — Christopher E. Everett
*Assistant Examiner* — Yvonne Trang Follansbee
(74) *Attorney, Agent, or Firm* — JCIPRNET

(57) ABSTRACT

A relay apparatus is provided to achieve high-speed control, while suppressing costs for communication with a plurality of devices, by notifying additional information of the devices to a master apparatus and increasing the efficiency of transmission/reception of signals among the master apparatus and the devices. The relay apparatus communicates with a plurality of devices through a single device communication port. The relay apparatus receives additional information from each of the plurality of devices; and transmits/receives signals in units of groups to which each of the plurality of devices belongs.

13 Claims, 8 Drawing Sheets

(56) References Cited

U.S. PATENT DOCUMENTS

| | | | |
|---|---|---|---|
| 2009/0002150 | A1 | 1/2009 | Zilberstein et al. |
| 2016/0041539 | A1 | 2/2016 | Kemp et al. |
| 2018/0335762 | A1* | 11/2018 | Lai .......................... H02J 13/00 |

FOREIGN PATENT DOCUMENTS

| | | |
|---|---|---|
| CN | 101505124 | 8/2009 |
| CN | 101763118 | 6/2010 |
| CN | 201945855 | 8/2011 |
| CN | 103404082 | 11/2013 |
| CN | 104115508 | 10/2014 |
| CN | 106062646 | 10/2016 |
| CN | 106165350 | 11/2016 |
| EP | 2660670 | 11/2013 |
| EP | 3012697 | 4/2016 |
| EP | 3104235 | 12/2016 |
| JP | S58120341 | 7/1983 |
| JP | H02127701 | 5/1990 |
| JP | H02216998 | 8/1990 |
| JP | H0837688 | 2/1996 |
| JP | H095125 | 1/1997 |
| JP | H0916517 | 1/1997 |
| JP | H10128617 | 5/1998 |
| JP | 2000155613 | 6/2000 |
| JP | 2001285501 | 10/2001 |
| JP | 2003131708 | 5/2003 |
| JP | 2004185247 | 7/2004 |
| JP | 2006190295 | 7/2006 |
| JP | 2006517320 | 7/2006 |
| JP | 2006527426 | 11/2006 |
| JP | 2015216698 | 12/2015 |
| KR | 20140064267 | 5/2014 |
| WO | 03001306 | 1/2003 |

OTHER PUBLICATIONS

HMS Industrial Networks, "anybus", AS-interface, retrieved: Nov. 24, 2016, available at: http://www.anybus.jp/technologies/asi.shtml.

IO-Link community, "IO-Link", IO-Link,retrieved: Nov. 24, 2016, available at: http://www.io-link.com/en/Technology/what_is_IO-Link.php.

"International Preliminary Report on Patentability (Form PCT/IPEA/409) of PCT/JP2017/037729", dated Sep. 12, 2018, with English translation thereof, pp. 1-8.

"International Search Report (Form PCT/ISA/210)"of PCT/JP2017/037729, dated Jan. 23, 2018, with English translation thereof, pp. 1-4.

"Search Report of Europe Counterpart Application", dated Aug. 27, 2020, p. 1-p. 9.

Office Action of Japan Counterpart Application, with English translation thereof, dated Oct. 27, 2020, pp. 1-6.

"Office Action of China Counterpart Application" with English translation thereof, dated Jul. 23, 2021, p. 1-p. 19.

"Office Action of Japan Counterpart Application" with English translation thereof, dqated Jul. 12, 2022, p. 1-p. 6.

"Office Action of Japan Counterpart Application" with English translation thereof, dated Nov. 8, 2022, p. 1-p. 7.

* cited by examiner (A)

| INFORMATION | USE |
|---|---|
| PRODUCT TYPE | USED TO SPECIFY COMPONENT AT TIME OF REPLACEMENT AND USED TO PREVENT REPLACEMENT ERROR |
| SERIAL NO./LOT NO. | USED FOR ANALYSIS OF CHARACTERISTICS AT TIME OF FAILURE (MAINLY USED AT TIME OF MAKING INQUIRY TO MANUFACTURER) |
| CONNECTION POSITION | USED TO SPECIFY COMPONENT AND PREVENT REPLACEMENT ERROR |
| COMMENT | FREE MEMO OF USER (FOR EXAMPLE: SWITCH OF DOOR ON NORTH SIDE OF UNIT 1 |
| POWER SUPPLY VOLTAGE VALUE | MONITOR AND WARN STABILITY OF POWER SUPPLY WITH OPERATION POWER SUPPLY VOLTAGE AT TIME OF OPERATION |
| ENERGIZATION TIME | SPECIFY REPLACEMENT TIME PERIOD FROM "HOW MUCH DEVICE IS DRIVEN" AND NOTIFY |
| NUMBER OF OPERATIONS | SPECIFY REPLACEMENT TIME PERIOD FROM "HOW MANY ON/OFF HAS BEEN MADE" AND NOTIFY OF REPLACEMENT TIME PERIOD |
| REPLACEMENT DATE | SPECIFY NEXT REPLACEMENT TIME PERIOD FROM "WHEN DEVICE HAS BEEN REPLACED" AND NOTIFY OF NEXT REPLACEMENT TIME |
| ON/OFF THRESHOLD VALUE | · ANALOG DATA OF DEVICE FOR WHICH ON/OFF OF SIGNAL IS DETERMINED<br>· SPECIFY WEAR CONDITION AND CONTAMINATION CONDITION OF SENSOR, AND SPECIFY MAINTENANCE (REPLACEMENT, CLEANING, OR THE LIKE.) TIME PERIOD |

(B)

| AFFILIATON GROUP | DEVICE ID |
|---|---|
| GROUP P | 30A(1)~30A(3) |
| GROUP Q | 30A(4)~30A(5) |
| GROUP S | 30B(1)~30B(3) |
| GROUP T | 30B(4)~30B(5) |

FIG.4

SLAVE APPARATUS, CONTROL METHOD OF SLAVE APPARATUS, MASTER-SLAVE CONTROL SYSTEM, AND RECORDING MEDIUM THAT RECORDS INFORMATION PROCESSING PROGRAM

CROSS-REFERENCE TO RELATED APPLICATION

This application is a 371 application of the International PCT application serial no. PCT/JP2017/037729, filed on Oct. 18, 2017, which claims the priority benefit of Japan Patent Application No. 2017-013540, filed on Jan. 27, 2017. The entirety of each of the above-mentioned patent applications is hereby incorporated by reference herein and made a part of this specification.

TECHNICAL FIELD

The present invention relates to a slave apparatus or the like in a master-slave control system.

BACKGROUND ART

In a factory automation (FA) system, a relay apparatus that relays data between a control apparatus and a device is known as related art.

For example, Non-Patent Literature 1 (HMS Industrial Networks, "anybus", (online), AS-interface, (searched for on Nov. 24, 2016), Internet <URL: http://www.anybus.jp/technologies/asi.shtml>) discloses a relay apparatus in an FA system, in which the relay apparatus capable of receiving only a detection signal (ON/OFF signals) of a sensor apparatus receives detection signals from a plurality of sensor apparatuses. Further, Non-Patent Literature 2 (IO-Link community, "IO-Link", (online), IO-Link, (searched for on Nov. 24, 2016), Internet <URL: http://www.io-link.com/en/Technology/what_is_IO-Link.php>) discloses a relay apparatus in an FA system, which is a relay apparatus capable of receiving a detection signal (cyclic data) that is an ON/OFF signal and additional information (acyclic data) from a plurality of sensor apparatuses connected in parallel. Technologies according to Non-Patent Literature 1 and Non-Patent Literature 2 will be described based on FIG. 8.

FIG. 8 is a diagram illustrating an overview of a control system 99 disclosed in Non-Patent Literature 1 and a control system 98 disclosed in Non-Patent Literature 2. The control system 99 illustrated in part (A) of FIG. 8 is a master-slave control system including a safety control apparatus 920 serving as a master apparatus, and a relay apparatus 910 of the related art that is a slave apparatus connected to the master apparatus via a network 940. The relay apparatus 910 of the related art in the control system 99 is a relay apparatus for performing transmission and reception of data between a plurality of sensors 930(1) to 930(5) and the safety control apparatus 920. The relay apparatus 910 of the related art can receive only detection signals (ON/OFF signals) of the plurality of sensors 930(1) to 930(5).

The control system 98 illustrated in part (B) of FIG. 8 is a master-slave control system including a safety control apparatus 820 serving as a master apparatus, and a relay apparatus 810 of the related art that is a slave apparatus. The relay apparatus 810 of the related art in the control system 98 can receive a detection signal (an ON/OFF signal) and additional information different from the detection signal from each of a plurality of sensors 830(1) to 830(5). The relay apparatus 810 of the related art includes a plurality of device communication ports 812(1) to 812(5) for connection to each of the plurality of sensors 830(1) to 830(5).

SUMMARY OF INVENTION

Technical Problem

However, the related art as described above has an issue in that the detection signal that is an ON/OFF signal and the additional information cannot be received from the plurality of sensor apparatuses connected in series.

Specifically, the relay apparatus of Non-Patent Literature 1 can receive only the detection signal (the ON/OFF signal) of the sensor apparatus, and cannot receive additional information of the sensor apparatus. Further, although the relay apparatus of Non-Patent Literature 2 can receive the detection signal and the additional information from the plurality of sensor apparatuses, it is necessary to connect the plurality of sensor apparatuses in parallel to the own apparatus, and the detection signal and the additional information cannot be received from a plurality of sensor apparatuses connected in series to the own apparatus. That is, the relay apparatus of Non-Patent Literature 2 needs to include the same number of communication ports as the number of detectors to be installed, in order to connect a plurality of sensor apparatuses in parallel to the own apparatus. Therefore, in an FA system using the relay apparatus of Non-Patent Literature 2, as the number of detectors to be installed increases, it is necessary to additionally prepare the same number of communication ports as the increased number of detectors, and costs for facility investment thus tend to increase.

Further, in the control system 98 disclosed in Non-Patent Literature 2, the safety control apparatus 820 receives the detection signals and the additional information from the plurality of respective sensor apparatuses via the relay apparatus 810 of the related art, and executes a process corresponding to all the received detection signals. That is, the safety control apparatus 820 executes a process corresponding to all the received detection signals after receiving the detection signals from all the sensor apparatuses and, therefore, there is a concern that it is difficult to shorten the time taken from reception of the detection signals to completion of the process.

An object of an aspect of the present invention is to provide a slave apparatus or the like capable of notifying a master apparatus of additional information of each of a plurality of devices while suppressing costs for communication with the plurality of devices, and realizing high-speed control by making transmission and reception of signals between the master apparatus and the plurality of devices efficient.

Solution to Problem

In order to solve the above problems, a slave apparatus according to an aspect of the present invention is a slave apparatus connected to a controller that is a master apparatus, the slave apparatus including: a device communication control unit that communicates with a plurality of devices respectively that are connected in series via a single communication port; a higher-level communication control unit that controls communication with the controller; and a storage unit that stores grouping information that defines groups to which each of the plurality of devices belongs. The higher-level communication control unit is able to transmit, to the controller, additional information held by each of the plurality of devices received by the device communication control unit, and executes at least one of (1) transmission of an output signal indicating ON or OFF to all devices belonging to a certain group, which is executed by the device communication control unit when the higher-level communication control unit receives one output information indicating ON or OFF from the controller, and (2) transmission of one input information indicating stationary or non-stationary of the entire certain group to the controller, which is executed by the higher-level communication control unit when the device communication control unit receives an input signal indicating stationary or non-stationary from each of the devices belonging to the certain group.

In order to solve the above problems, a control method according to an aspect of the present invention is a method of controlling a slave apparatus connected to a controller that is a master apparatus, the method including: a device communication control step of communicating with a plurality of devices 30 respectively that are connected in series via a single communication port; and a higher-level communication control step of controlling communication with the controller. The slave apparatus includes a storage unit that stores grouping information that defines groups to which each of the plurality of devices belongs, additional information held by each of the plurality of devices received in the device communication control step is able to be transmitted to the controller in the higher-level communication control step, and the higher-level communication control step includes at least one of (1) transmission of an output signal indicating ON or OFF to all devices belonging to a certain group, which is executed in the device communication control step when one output information indicating ON or OFF is received from the controller in the higher-level communication control step, and (2) transmission of one input information indicating stationary or non-stationary of the entire certain group to the controller, which is executed in the higher-level communication control step when an input signal indicating stationary or non-stationary is received from each of the devices belonging to the certain group in the device communication control step.

Advantageous Effects of Invention

According to an aspect of the present invention, there is the effect that it is possible is to notify a master apparatus of additional information of each of the plurality of devices while suppressing costs for communication with the plurality of devices, and realizing high-speed control by making transmission and reception of signals between the master apparatus and the plurality of devices efficient.

BRIEF DESCRIPTION OF DRAWINGS

FIG. 4 illustrates an example of additional information and grouping information that are used in the master-slave control system of FIG. 2.

DESCRIPTION OF EMBODIMENTS

Embodiment 1

Figure 1:
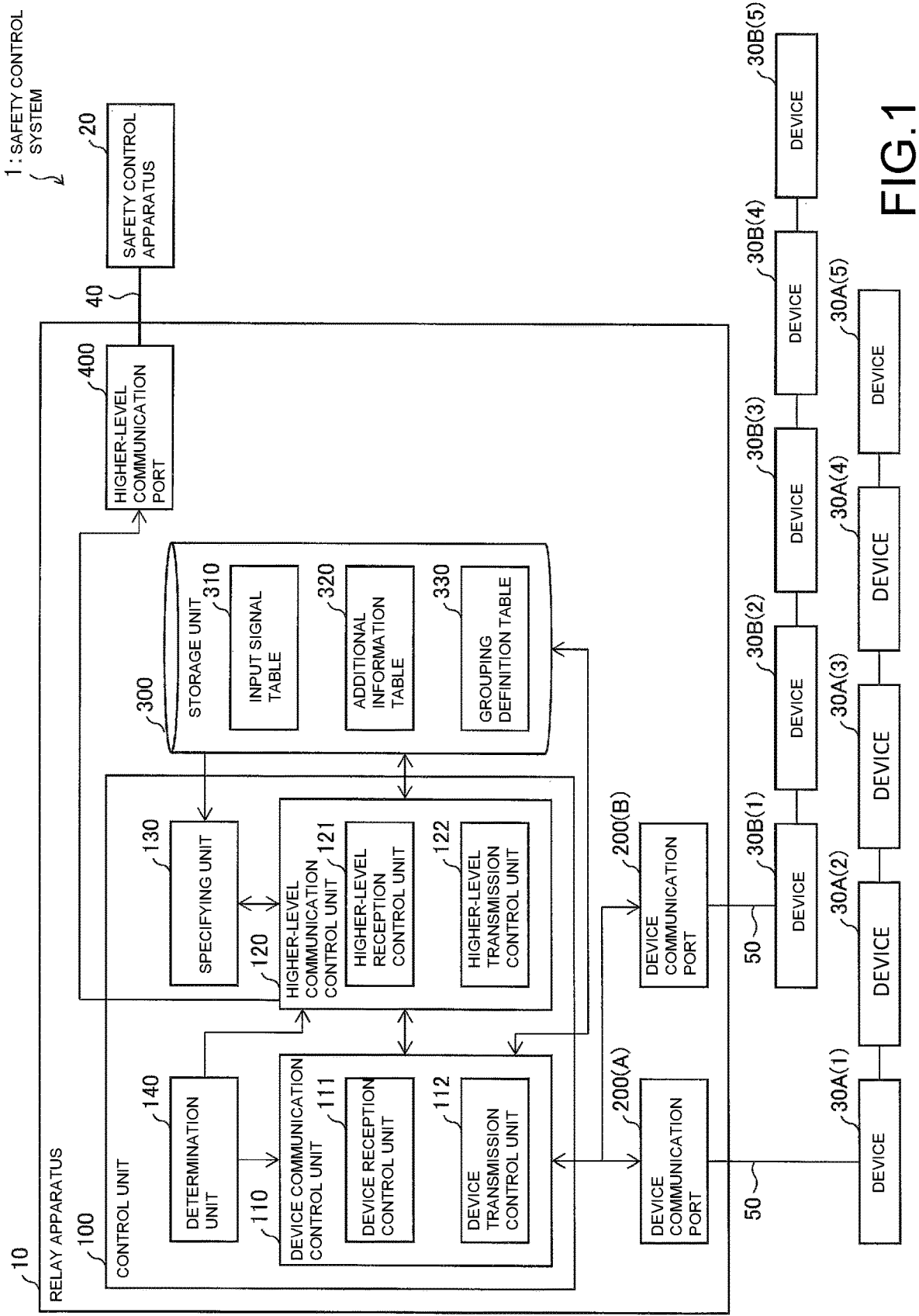
FIG. 1 is a block diagram illustrating a main configuration of a relay apparatus according to embodiment 1 of the present invention.

Hereinafter, embodiment 1 of the present invention will be described in detail with reference to FIGS. 1 to 6. The same or corresponding portions in the drawings are denoted by the same reference numerals and description thereof will not be repeated. An overview of a safety control system 1 including the relay apparatus 10 will first be described with reference to FIGS. 2 and 3 in order to facilitate understanding of a relay apparatus 10 (a slave apparatus) according to an aspect of the present invention.

Although an example in which a control system including the relay apparatus 10 according to an aspect of the present invention is the safety control system 1 (a master-slave control system) will be described hereinafter, it is not indispensable for the control system including the relay apparatus 10 to be the safety control system. The control system including the relay apparatus 10 may be a master-slave control system including the relay apparatus 10 that is a slave apparatus, and a master apparatus connected to the relay apparatus 10, and may be a master-slave control system having the following functions. That is, the control system including the relay apparatus 10 may be a master-slave control system including a "master apparatus using an input signal of each of one or more devices and additional information held by each of the one or more devices", and "the relay apparatus 10 serving as a slave apparatus".

(Overview of System)

Figure 2:
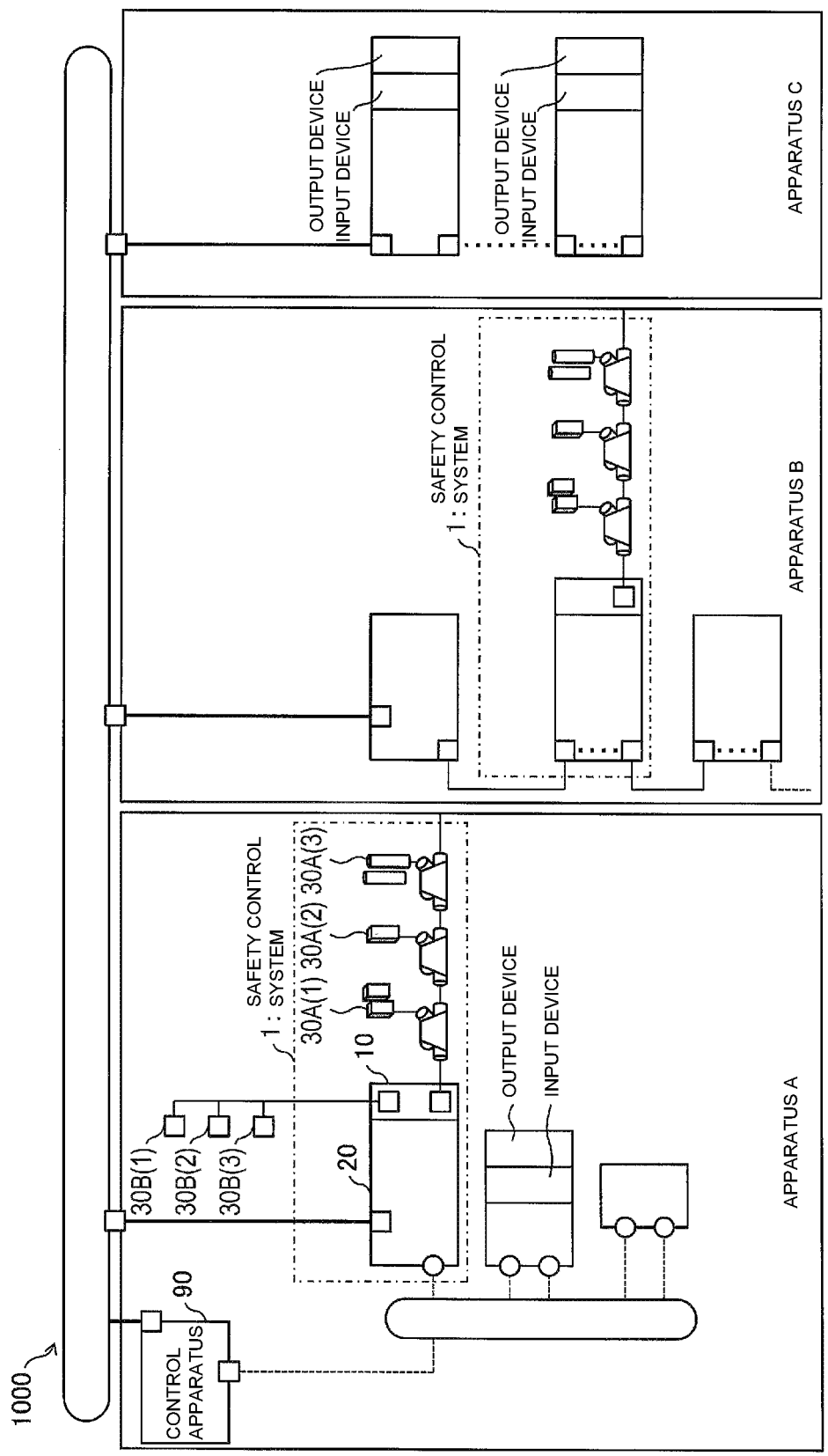
FIG. 2 is a diagram illustrating an overview of a higher-level master-slave control system including a safety control system according to embodiment 1 of the present invention as a partial system.

FIG. 2 is a diagram illustrating an overview of a higher-level master-slave control system 1000 including the safety control system 1 as a partial system. The safety control system 1 in the higher-level master-slave control system 1000 is a master-slave control system including the following devices. That is, the safety control system 1 is a master-slave control system including a safety control apparatus 20 as a master apparatus and a relay apparatus 10 that is a slave apparatus connected to the master apparatus via a field network 40 (a higher-level bus, that is, a higher-level communication network). A plurality of relay apparatuses 10 may be connected to the safety control apparatus 20. Further, a slave apparatus other than the relay apparatus 10, in addition to the relay apparatus 10, may be connected to the safety control apparatus 20. That is, a plurality of slave apparatuses may be connected to the safety control apparatus 20 that is a master apparatus. Further, a plurality of master apparatuses (for example, safety control apparatuses 20A and 20B) may be connected to the relay apparatus 10 that is a slave apparatus, and details thereof will be described below with reference to FIG. 6.

As illustrated in FIG. 2, the safety control apparatus 20 may be a slave apparatus in the "higher-level master-slave control system 1000", which is a master-slave control system at a higher level. In other words, the safety control system 1 may be a part of the higher-level master-slave control system 1000 including the safety control system 1 as a partial system. The higher-level master-slave control system 1000 includes a control apparatus 90 serving as a master apparatus (a higher-level master apparatus) and a safety control apparatus 20 serving as a slave apparatus connected to the control apparatus 90. The control apparatus 90 is referred to as a master apparatus (a higher-level master apparatus) in the higher-level master-slave control system 1000 in the sense that the control apparatus 90 manages data transfer in the higher-level master-slave control system 1000.

The higher-level master-slave control system 1000 is configured by combining various devices (devices A, B, and C in the example illustrated in FIG. 2). The higher-level master-slave control system 1000 is, for example, a production system including a device A that is a product production apparatus, a device B that is a product movement device, and a device C that is a product inspection device. There may be a device that need not be controlled by the safety control apparatus 20, such as the device C illustrated in FIG. 2 (for example, an inspection device that does not adversely affect human life, human bodies, or products due to driving thereof), among various devices included in the higher-level master-slave control system 1000. Further, the higher-level master-slave control system 1000 may include a production apparatus of which driving is controlled when a "non-stationary" state is detected as a result of checking the driving, such as the device A.

It should be noted that the master apparatus and the slave apparatus are defined in consideration of a function of controlling data transfer on the field network 40 connecting the safety control apparatus 20 and the relay apparatus 10, and information that is transmitted or received between the respective devices is not particularly limited. Examples of slave apparatuses other than the relay apparatus 10 include a motor control apparatus (a servo driver) serving as an output unit for giving a control instruction from the safety control apparatus 20 to an output device that is an output destination.

The safety control apparatus 20 is referred to as a "master apparatus" in the sense that the safety control apparatus 20 manages data transfer with the relay apparatus 10 via the field network 40, and performs safety control of the entire safety control system 1. Specifically, the safety control apparatus 20 first acquires, as input data, information from the devices 30A(1) to 30A(5) and 30B(1) to 30B(5) serving as input devices via the relay apparatus 10. Second, the safety control apparatus 20 executes a computation process using the acquired input data according to a user program incorporated in advance. The safety control apparatus 20 executes the computation process to determine content of the control of the devices 30A(1) to 30A(5) and 30B(1) to 30B(5). Third, the safety control apparatus 20 outputs control data corresponding to the determined content of the control to the devices 30A(1) to 30A(5) and 30B(1) to 30B serving as output devices through the relay apparatus 10. For example, when the safety control apparatus 20 receives "input information indicating non-stationary (OFF)" from the relay apparatus 10 via the field network 40, the safety control apparatus 20 may execute a predetermined safety control operation, for example, to cause the driving apparatus to stop driving. Further, when the safety control apparatus 20 does not receive "input information indicating stationary (ON)" at predetermined time intervals from the relay apparatus 10 via the field network 40, the safety control apparatus 20 may execute a predetermined control operation.

For the devices 30A(1) to 30A(5) and 30B(1) to 30B(5), the devices 30A(1) to 30A(5) are a plurality of devices connected to a device communication port 200A of the relay apparatus 10 through a device communication cable 50A. Similarly, the devices 30B(1) to 30B(5) are a plurality of devices connected to a device communication port 200B of the relay apparatus 10 through a device communication cable 50B. When it is not necessary to distinguish between each of the plurality of devices 30A(1) to 30A(5) connected to the device communication port 200A of the relay apparatus 10, the devices are simply referred to as a "device 30A". Similarly, when it is not necessary to distinguish between each of the plurality of devices 30B(1) to 30B(5) connected to the device communication port 200B of the relay apparatus 10, the devices are simply referred to as a "device 30B". Furthermore, in a case in which it is not necessary to distinguish between the device 30A connected to the device communication port 200A and the device 30B connected to the device communication port 200B, the devices are simply referred to as a "device 30". Similarly, when it is not necessary to distinguish between the device communication ports 200A and 200B of the relay apparatus 10, device communication ports are simply referred to as a "device communication port 200". In addition, when it is not necessary to distinguish the device communication cables 50A and 50B, the device communication cables are simply referred to as a "device communication cable 50".

It should be noted that, in the example illustrated in FIG. 2, three devices 30A(1) to 30A(3) and three devices 30B(1) to 30B(3) connected in series are connected to the device communication ports 200A and 200B of the relay apparatus 10, respectively. However, it is not indispensable for the three devices 30 to be connected to each of the device communication ports 200A and 200B. One or more devices 30 connected in series may be connected to the respective device communication ports 200A and 200B via the device communication cables 50A and 50B.

The device 30 is an input device or an output device. The device 30 that is an input device is, for example, a "detector" such as a temperature sensor or an optical sensor, or a "switch (a pushbutton switch, a limit switch, a pressure switch, or the like)". The device 30 that is an output device, is, for example, an "actuator", a "relay", an "electromagnetic valve", an "indicator", or an "indicating lamp".

Figure 3:
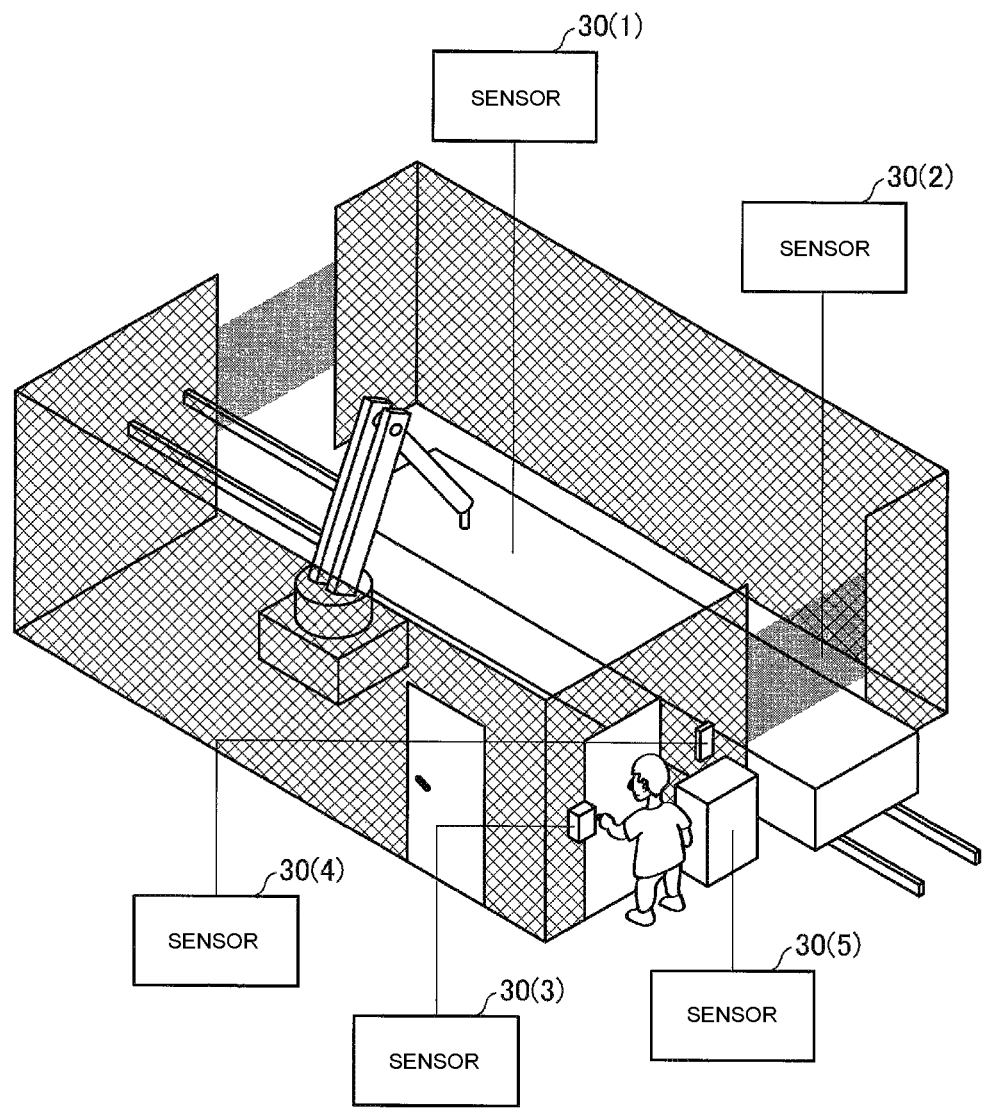
FIG. 3 is a diagram illustrating an installation example of a device.

As illustrated in FIG. 3, the plurality of devices 30(1) to 30(5) as input devices are installed, for example, in areas that people enter. The devices 30(1) to 30(5) serving as input devices detect a "non-stationary" state (such as hazard and abnormality), for example, such that human life, human bodies, and products are not damaged due to the driving of the driving apparatus, which is a target of the safety control operation in the safety control apparatus 20.

FIG. 3 is a diagram illustrating an installation example of a plurality of devices 30(1) to 30(5) as input devices. As illustrated in FIG. 3, since there is a plurality of hazard occurrence portions for one driving apparatus (a power unit), a plurality of devices 30(1) to 30(5) need to be installed for one or more driving apparatuses that are controlled by the safety control apparatus 20. When at least one of the devices 30(1) to 30(5) recognizes a "non-stationary" state (detects abnormality or the like), the safety control apparatus 20 needs to control the driving apparatus (perform a safety control operation).

The field network 40 connects the safety control apparatus 20 to the relay apparatus 10 and, for example, transmits various data that the safety control apparatus 20 receives from the relay apparatus 10 or the safety control apparatus 20 transmits to the relay apparatus 10. The field network 40 is, for example, EtherCAT (registered trademark), PROFI- NET (registered trademark), MECHATROLINK (registered trademark)-III, Powerlink, SERCOS (registered trademark)-III, or CIP Motion. Further, the field network 40 may be EtherNet/IP (registered trademark), DeviceNet, CompoNet (registered trademark), or the like. The field network 40 transfers "additional information" and "input information" of the device 30 that the safety control apparatus 20 receives from the relay apparatus 10, or transfers to the relay apparatus 10 "output information" that the safety control apparatus 20 transmits to the relay apparatus 10.

The device communication cable 50 connects the relay apparatus 10 to the device 30 and transfers, for example, various data that the relay apparatus 10 receives from the device 30 or the relay apparatus 10 transmits to the device 30. The device communication cable 50 transfers "additional information" and an "input signal" that the relay apparatus 10 receives from the device 30, or transfers an "output signal" that the relay apparatus 10 transmits to the device 30.

Additionally, in the following description, the safety control system 1 in which data is transmitted and received between the safety control apparatus 20 and the relay apparatus 10 by data frames being sequentially transferred on the field network 40 will be described. Further, in the following description, the field network 40 connecting the safety control apparatus 20 to the relay apparatus 10 may be referred to as an "higher-level bus (higher-level communication network)". On the other hand, the device communication cable 50 connecting the relay apparatus 10 to the device 30 may be referred to as a "lower-level bus (lower-level communication network)".

The relay apparatus 10 is a relay apparatus for transmitting and receiving data between the device 30 and the safety control apparatus 20 that is a master. In other words, the relay apparatus 10 is, for example, a device communication management unit serving as an output unit that provides output information such as a control instruction from the safety control apparatus 20 to the device 30 that is an output destination, or a device communication management unit serving as an input unit for allowing the safety control apparatus 20 to acquire information (input information and additional information) related to, for example, a state of the device 30 that is an input source. One or more devices 30 are connected to the relay apparatus 10 through a device communication cable 50. The relay apparatus 10 includes the device communication port 200 to which the device communication cable 50 for communication with one or more devices 30 connected in series is connected. It should be noted that although the relay apparatus 10 according to the embodiment includes two communication ports, that is, the device communication ports 200A and 200B, to which the device communication cable 50 is connected, it is not indispensable for the number of communication ports for communication with the device 30 to be two. The relay apparatus 10 may include one or more communication ports for communication with the device 30.

In the safety control system 1, the safety control apparatus 20 performs reception of, for example, information (input information) detected by the device 30 serving as an input device via the relay apparatus 10, and performs operation control of the device 30 serving as an output device. In addition, a human machine interface (HMI) may be connected to the safety control apparatus 20 via, for example, a universal serial bus (USB) cable. The HMI is a means for allowing a person and machine to exchange information. Specifically, the HMI is a means with which the person operates the machine (provides an instruction to the machine) or the machine informs the person of a current status and results. For the HMI, examples of the means with which the person provides an instruction to the machine include switches, buttons, handles, dials, pedals, remote controllers, microphones, keyboards, and mice. In addition, examples of the means with which the machine transfers information on the current status and results to the person include a liquid crystal screen, a meter, a lamp, and a speaker.

(Input signal from input device)

In the safety control system 1, the device 30 outputs a detection signal (an input signal) such as ON/OFF information indicating that the device 30 has detected a "stationary" state (ON) or a "non-stationary" state (OFF). The relay apparatus 10 receives the "input signal" indicating ON (stationary) or OFF (non-stationary) from each of the plurality of devices 30.

(Additional Information from Input Device)

Further, the device 30 outputs "additional information" held by the device 30. The relay apparatus 10 receives the "additional information" held by each of the plurality of devices 30 from each of the plurality of devices 30. When the relay apparatus 10 receives a request for additional information (transmission request) from the safety control apparatus 20, the relay apparatus 10 transmits the additional information of each of the plurality of devices 30 to the safety control apparatus 20. Examples of the "additional information" is communication properties of the device 30, device parameters of the device 30, and identification data (identification information) of the device 30. Details thereof will be described below with reference to FIG. 4.

(Output Signal to Output Device)

In the safety control system 1, the device 30 receives an output signal indicating ON or OFF from the relay apparatus 10. The device 30 that is an output device executes a process corresponding to the output signal received from the relay apparatus 10. For example, when the device 30 is a switch, the device 30 switches to an "OFF" state when receiving an output signal indicating OFF from the relay apparatus 10, and switches to an "ON" state when receiving an output signal indicating ON.

(Input Information to Master Apparatus)

In the safety control system 1, the relay apparatus 10 transmits information indicated by "input signals of each of the plurality of devices 30" as "input information" to the safety control apparatus 20. Here, the relay apparatus 10 combines "the input signals of each of the plurality of devices 30" for each group to which each of the plurality of devices 30 belongs. The relay apparatus 10 transmits input information for each group (information indicated by input signals of all the devices belonging to the group as a whole) to the safety control apparatus 20.

Specifically, when the relay apparatus 10 receives an input signal indicating "stationary" from all the devices 30 belonging to the group P, the relay apparatus 10 transmits input information indicating "stationary" of the "group P" as the input information of the group P to the safety control apparatus 20. In addition, when the relay apparatus 10 receives an input signal indicating "non-stationary" from at least one of the devices 30 belonging to the group P, the relay apparatus 10 transmits input information indicating "non-stationary" of the "group P" as the input information of the group P to the safety control apparatus 20. For example, the relay apparatus 10 arranges states detected by each of the plurality of devices 30 belonging to the group P into one information, and notifies the safety control apparatus 20 of one input information indicating a "stationary (ON)" or "non-stationary (OFF)" of the entire group P. In other words, the relay apparatus 10 arranges the input signals of the plurality of devices 30 into groups and transmits one combined input information to the safety control apparatus 20, instead of transmitting the input signals of each of the plurality of devices 30 to the safety control apparatus 20 one by one.

In the safety control system 1, the safety control apparatus 20 determines, for example, whether or not the safety control operation needs to be executed using the "input information". The safety control apparatus 20 determines that "the execution of the safety control operation is needed", for example, when the safety control apparatus 20 receives the "input information indicating non-stationary". In addition, when the safety control apparatus 20 receives, for example, "input information indicating stationary", the safety control apparatus 20 determines that "execution of the safety control operation is unnecessary". The safety control apparatus 20 can ascertain, for example, the states detected by the devices 30 belonging to each group by receiving the input information for each group. That is, the safety control apparatus 20 ascertains (1) that the "non-stationary" state has been detected by the device 30 belonging to the group P by receiving the input information indicating "non-stationary" of the group P and ascertains (2) that the "stationary" state has been detected by the device 30 belonging to the group P by receiving the input information indicating "stationary" of the group P. The safety control apparatus 20 receives one input information combined by arranging the input signals of the plurality of devices 30 for each group and determines content of control, instead of receiving all the input signals by receiving the input signals of each of the plurality of devices 30 one by one and then determining the content of control.

(Output Information from Master Apparatus)

In the safety control system 1, the safety control apparatus 20 transmits "output information indicating ON or OFF" for causing the device 30 to execute the content of the control determined by the safety control apparatus 20, that is, causing the device 30 to execute a predetermined process. When the relay apparatus 10 receives the output information indicating ON or OFF from the safety control apparatus 20, the relay apparatus 10 transmits an output signal indicating ON or OFF, which corresponds to the output information, to a plurality of devices 30 connected in series to the device communication port 200. The plurality of devices 30 connected in series to the device communication port 200 receive the output signal corresponding to control data (output information) output from the safety control apparatus 20, via the relay apparatus 10.

Here, the safety control apparatus 20 can transmit "output information indicating ON or OFF" for causing the device 30 belonging to a specific group to execute a predetermined process, that is, output information having the specific group as a destination. When the relay apparatus 10 receives the output information having the specific group as a destination from the safety control apparatus 20, the relay apparatus 10 transmits an output signal corresponding to the output information only to all the devices 30 belonging to the specific group. For example, when the relay apparatus 10 receives output information indicating ON, which has the group P as a destination, the relay apparatus 10 transmits the output signal indicating ON to all the devices 30 belonging to the group P and does not transmit the output signal to the devices 30 belonging to groups other than the group P. Similarly, when the relay apparatus 10 receives output information indicating OFF, which has the group Q as a destination, the relay apparatus 10 transmits the output signal indicating OFF to all the devices 30 belonging to the group Q and does not transmit the output signal to the devices 30 belonging to groups other than the group Q.

(Arrangement of Safety Control System According to Aspect of the Present Invention)

Figure 8:
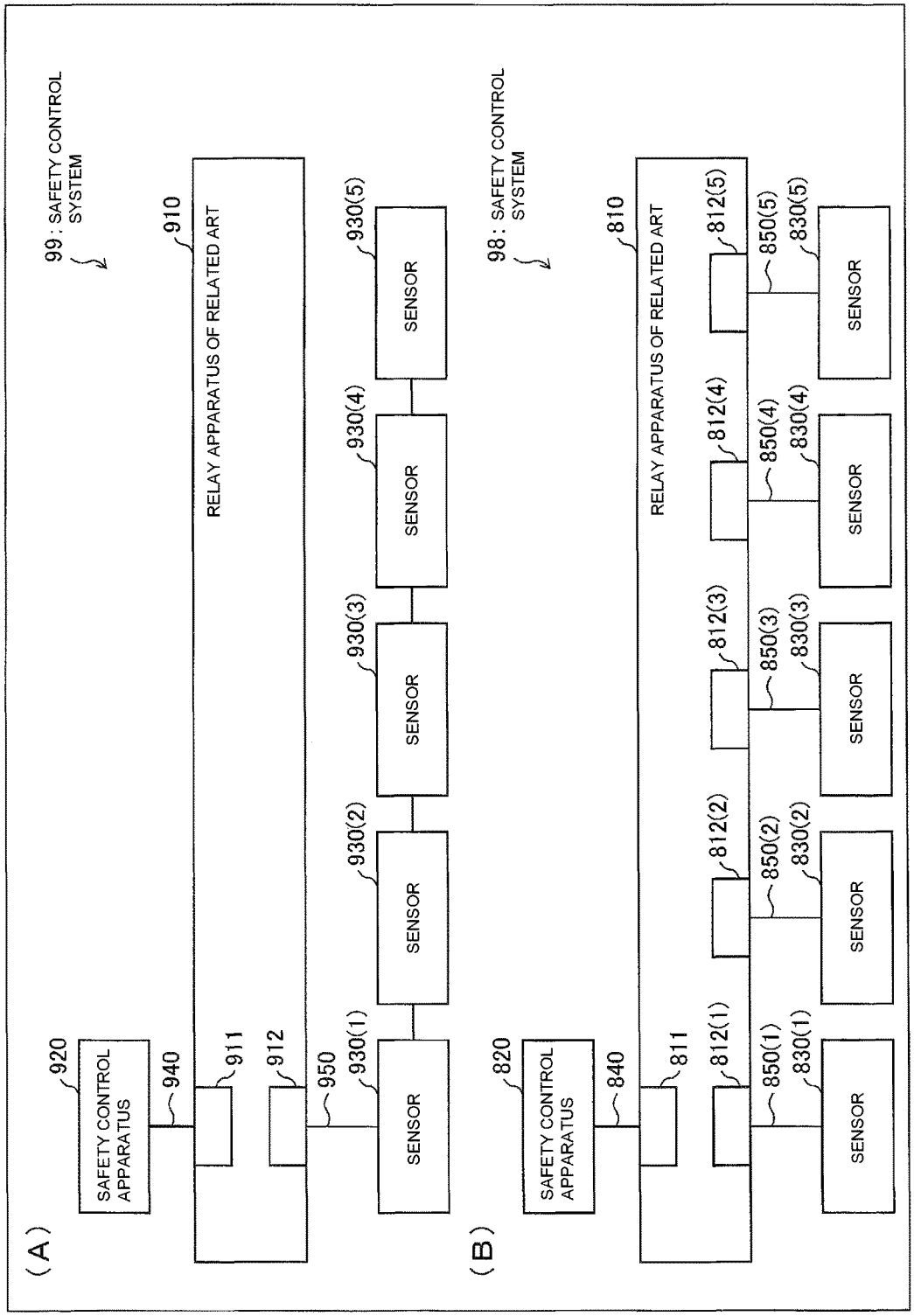
FIG. 8 is a diagram illustrating an overview of a master-slave control system of the related art.

The safety control system 1 described above based on FIG. 2 differs from the control systems 99 and 98 illustrated in FIG. 8 in the following points. That is, in the control system 99 illustrated in FIG. 8(A), the relay apparatus 910 of the related art receives only the detection signals (ON/OFF signals) of the plurality of respective sensors 930(1) to 930(3). Further, in the control system 98 illustrated in FIG. 8B, the relay apparatus 810 of the related art includes the plurality of device communication ports 812(1) to 812(5). The relay apparatus 810 of the related art receives detection signals (ON/OFF signals) and additional information different from the detection signals from each of the plurality of sensors 830(1) to 830(3) connected to the plurality of device communication ports 812(1) to 812(5) respectively.

Further, in the control system 98, the safety control apparatus 820 receives the detection signals and the additional information from the respective sensors 830(1) to 830(3), and executes a process corresponding to all the received detection signals. That is, since the safety control apparatus 820 executes the process corresponding to all the received detection signals after receiving the detection signals of all the sensors 830(1) to 830(3), it is difficult to shorten the time taken from reception of the detection signals to completion of the process.

On the other hand, the relay apparatus 10 in the safety control system 1 receives the additional information of each of the plurality of devices 30 connected in series via the single device communication port 200, and transmits the received additional information to the safety control apparatus 20. Since the relay apparatus 10 can receive the additional information of each of the plurality of devices 30 via the single device communication port 200, it is possible to suppress costs for communication with the plurality of devices 30 as compared with the relay apparatus 810 of the related art. The relay apparatus 10 further performs the following, two data relay functions between the safety control apparatus 20 and the device 30.

First, the relay apparatus 10 receives an input signal (for example, a detection signal indicating stationary (ON) or non-stationary (OFF)) from each of the plurality of devices 30 connected in series, and transmits information indicated by the plurality of received input signals as a whole, as input information, to the safety control apparatus 20. In other words, the safety control apparatus 20 can ascertain the information indicated by all the input signals of each of the plurality of devices 30 only by receiving one input information from the relay apparatus 10. Accordingly, the relay apparatus 10 can achieve efficient transmission and reception of signals between the safety control apparatus 20 and the plurality of devices 30 to realize high-speed control in the safety control system 1.

Second, the relay apparatus 10 receives one output information (control data) from the safety control apparatus 20, and transmits an output signal corresponding to the received one output information to the plurality of devices 30. In other words, the safety control apparatus 20 can instruct the plurality of devices 30 to execute a desired process only by transmitting the one output information to the relay apparatus 10. Accordingly, the relay apparatus 10 can achieve efficient transmission and reception of signals between the safety control apparatus 20 and the plurality of devices 30 to realize high-speed control in the safety control system 1.

In the safety control system 1, the relay apparatus 10 divides the plurality of devices 30 connected in series to the single device communication port 200 into one or more groups, and performs a data relay function between the devices 30 divided into groups and the safety control apparatus 20. For example, the relay apparatus 10 divides the devices 30A(1) to 30A(5) into the group P to which the devices 30A(1) to 30A(3) belong and the group Q to which the devices 30A(4) and 30A(5) belong, and executes the following data relay process.

First, the relay apparatus 10 arranges the input signals of each of the plurality of devices 30 according to the groups to which the devices 30 belong, and transmits the information indicated by all the input signals of the devices 30 in units of groups to the safety control apparatus 20. In other words, the relay apparatus 10 distinguishes between the information indicated by all the input signals of the respective devices 30A(1) to 30A(3) and the information indicated by all the input signals of the respective devices 30A(4) and 30A(5), and transmits the information to the safety control apparatus 20.

For example, when the relay apparatus 10 receives the input signal indicating non-stationary (OFF) from at least one of the devices 30A(1) to 30A(3), the relay apparatus 10 transmits input information indicating non-stationary (OFF) of the entire group P to the safety control apparatus 20. When the relay apparatus 10 receives the input signal indicating stationary (ON) from all of the devices 30A(1) to 30A(3), the relay apparatus 10 transmits input information indicating stationary (ON) of the entire group P to the safety control apparatus 20. Similarly, when the relay apparatus 10 receives the input signal indicating non-stationary (OFF) from at least one of the devices 30A(4) and 30A(5), the relay apparatus 10 transmits input information indicating non-stationary (OFF) of the entire group Q to the safety control apparatus 20. When the relay apparatus 10 receives the input signal indicating stationary (ON) from both of devices 30A(4) and 30A(5)), the relay apparatus 10 transmits input information indicating stationary (ON) of the entire group Q to the safety control apparatus 20. The relay apparatus 10 combines the input signals of each of the plurality of devices 30 (information detected by each of the plurality of devices 30) for each of the groups to which each of the plurality of devices 30 belongs. The relay apparatus 10 notifies the safety control apparatus 20 of one information indicating all the input signals of each of the devices 30 belonging to the group, as one input information, for each group.

Second, the relay apparatus 10 receives one "output information in units of groups (control data)" from the safety control apparatus 20, and transmits an output signal corresponding to the received "output information in units of groups" to all of the devices 30 in the group. In other words, the relay apparatus 10 distinguishes between the output information having the group P (the devices 30 belonging to the group P) as a destination and the output information having the group Q (the devices 30 belonging to the group Q) as a destination, and transmits the output signal to the devices 30 belonging to each group.

For example, when the relay apparatus 10 receives output information indicating "ON", which has the group P as a destination, the relay apparatus 10 transmits an output signal indicating "ON" only to the devices 30A(1) to 30A(3) and does not transmit the output signal indicating "ON" to the devices 30A(4) and 30A(5). When the relay apparatus 10 receives the output information indicating "ON", which has the group Q as a destination, the relay apparatus 10 transmits the output signal indicating "ON" only to the devices 30A(4) and 30A(5) and does not transmit an output signal indicating "ON" to the devices 30A(1) to 30A(3). The relay apparatus 10 acquires one "output information in units of groups" to transmit an output signal corresponding to the "output information in units of groups" to all the devices 30 belonging to the group to which the "output information in units of groups" is addressed.

The relay apparatus 10 executes at least one of the following, two information notification processes for relay (mutual information notification) of the signals between the safety control apparatus 20 and the plurality of devices 30. That is, the relay apparatus 10 executes at least one of (1) the information notification process from the device 30 to the safety control apparatus 20 and (2) the information notification process from the safety control apparatus 20 to the device 30. Here, "(1) the information notification process from the device 30 to the safety control apparatus 20" is, for example, "transmission of input information corresponding to the input signal of the device 30 (in particular, corresponding to all the input signals for each group) to the safety control apparatus 20". "(2) The information notification process from the safety control apparatus 20 to the device 30" is, for example, "transmission of an output signal corresponding to the output information from the safety control apparatus 20 (in particular, corresponding to output information for each group) to the device 30.

The safety control system 1 and the relay apparatus 10 of which the overview has been described above with reference to FIGS. 2 and 3 can be arranged as follows. That is, the safety control system 1 is a master-slave control system including the safety control apparatus 20 (the controller) serving as a master apparatus, and the relay apparatus 10 serving as a slave apparatus connected to the safety control apparatus 20. The relay apparatus 10 includes a device communication control unit 110 that communicates with each of the plurality of devices 30 connected in series via the device communication port 200 (a single communication port), a higher-level communication control unit 120 that controls the communication with the safety control apparatus 20, and a storage unit 300 that stores a grouping definition table 330 (grouping information) in which a group to which each of the plurality of devices 30 belongs has been defined. The higher-level communication control unit 120 can transmit the additional information held by each of the plurality of devices 30 received by the device communication control unit 110 to the safety control apparatus 20.

The relay apparatus 10 further executes at least one of the following, two processes. That is, the relay apparatus 10 executes at least one of (1) transmission of the output signal indicating ON or OFF to all the devices 30 belonging to a certain group, which is executed by the device communication control unit 110 when the higher-level communication control unit 120 receives one output information indicating ON or OFF from the safety control apparatus 20, and (2) transmission of one input information indicating stationary or non-stationary of the entire certain group to the safety control apparatus 20, which is executed by the higher-level communication control unit 120 when the device communication control unit 110 receives the input signal indicating stationary or non-stationary from each of the devices 30 belonging to a certain group.

With the above configuration, the relay apparatus 10 can transmit the "additional information of each of the plurality of devices 30" received via the device communication port 200 to the safety control apparatus 20, and executes at least one of the following processes. That is, the relay apparatus 10 executes at least one of (1) transmission of an output signal to all the devices 30 belonging to a certain group, which is executed when the output information is received from the safety control apparatus 20, and (2) transmission of the input information of the entire certain group, which is executed when the input signal is received from each of the devices 30 belonging to the certain group.

Here, the slave apparatus of the related art includes a plurality of communication ports to which a plurality of input devices is respectively connected, and the plurality of input devices are connected in parallel to the plurality of communication ports and receives additional information and input signals of each of the plurality of devices. Therefore, as the number of input devices to be installed increases, it is necessary to add and prepare the same number of communication ports as the number of increased input devices, and costs related to facility investment thus tend to increase.

On the other hand, the relay apparatus 10 receives "the additional information and the input signal" of each of the plurality of devices 30 connected in series, via the single device communication port 200. Therefore, an effect that the relay apparatus 10 needs only to prepare the single device communication port 200 for receiving "the additional information and the input signal" of each of the plurality of devices 30, and costs for the communication port or the like for communication with the device 30 can be suppressed as compared with the slave apparatus of the related art is achieved.

Further, in the master-slave control system of the related art, the master apparatus transmits (1) the output signal indicating ON or OFF to the plurality of devices respectively, or receives (2) the input signal output by the plurality of devices respectively.

On the other hand, the relay apparatus 10 executes at least one of (1) transmission of an output signal to all the devices 30 belonging to a certain group, which is executed when the output information is received from the safety control apparatus 20, and (2) transmission of the input information of the entire certain group, which is executed when the input signal is received from each of the devices 30 belonging to the certain group.

Therefore, in the safety control system 1 (the master-slave control system) including the relay apparatus 10, it is possible to (1) transmit the output signal to all the devices 30 belonging to the certain group simply by the safety control apparatus 20 transmitting the one output information to the relay apparatus 10. That is, an effect that the relay apparatus 10 makes the transmission of the output signal to the device 30 efficient as compared with the slave apparatus of the related art, and the safety control apparatus 20 can transmit an instruction to execute a desired process to the plurality of devices 30 at a higher speed than in the related art is achieved.

Further, in the safety control system 1 including the relay apparatus 10, it is possible to (2) execute a process corresponding to all the input signals of all the devices belonging to a certain group simply by the safety control apparatus 20 receiving the one input information only from the relay apparatus 10. That is, an effect that the relay apparatus 10 makes the reception of the input signal by the safety control apparatus 20 efficient, and the safety control apparatus 20 can be caused to execute the process corresponding to the input signals of the plurality of devices at a higher speed than in the related art is achieved.

Further, the relay apparatus 10 communicates with each of "the plurality of devices 30 connected in series" via the single device communication port 200. Therefore, the relay apparatus 10 also has excellent layout properties with respect to the device 30 and wirings such as the device communication cable 50, as compared with the relay apparatus of the related art that communicates with the plurality of devices 30 respectively that are connected in parallel via the same number of communication ports as the number of the plurality of devices 30.

In the safety control system 1, one or more output devices that output a predetermined operation when receiving an output signal are included in the plurality of devices 30 connected in series to the device communication port 200 of the relay apparatus 10. For example, at least one of the plurality of devices 30B(1) to 30B(5) connected in series to the device communication port 200B is an output device that outputs a predetermined operation when receiving the output signal. For example, the devices 30B(1) to 30B(3) are output devices.

When the higher-level communication control unit 120 receives the "one output information indicating ON or OFF", which has a certain group as a destination from the safety control apparatus 20, the device communication control unit 110 transmits the output signal indicating ON or OFF to all output devices belonging to the certain group.

Further, when the higher-level communication control unit 120 has received the "one output information indicating ON or OFF" for which a specific group is not specified as a destination from the safety control apparatus 20, the device communication control unit 110 transmits the output signal indicating ON or OFF to all the output devices connected to the relay apparatus 10. That is, the relay apparatus 10 regards the "one output information indicating ON or OFF" for which the destination is not specified, as "one output information indicating ON or OFF" addressed to a group to which all the output devices connected to the relay apparatus 10 belong.

For example, when the higher-level communication control unit 120 has received the output information indicating ON, of which the destination is a "group S", from the safety control apparatus 20, the device communication control unit 110 executes the following process. That is, the device communication control unit 110 first confirms that the devices 30B(1) to 30B(3) belong to the group S by referring to the grouping definition table 330 of the storage unit 300. When the device communication control unit 110 confirms that all the devices 30B(1) to 30B(3) are output devices, the device communication control unit 110 transmits the output signal indicating ON to all the devices 30B(1) to 30B(3).

With the above configuration, the relay apparatus 10 can transmit the "additional information of each of the plurality of devices 30" received via the device communication port 200 to the safety control apparatus 20, and can transmit the output signal to a plurality of output devices belonging to a certain group, for example, when receiving the output information from the safety control apparatus 20.

Therefore, an effect that the relay apparatus 10 makes the transmission of the output signal to the device efficient as compared with a case in which the safety control apparatus 20 transmits the output signal to the plurality of output devices respectively belonging to a certain group, and the safety control apparatus 20 can transmit an instruction to execute a desired process to the plurality of devices at a higher speed than in the related art is achieved.

In the grouping definition table 330, the plurality of devices 30 are divided into two or more groups.

With the above configuration, when (1) the higher-level communication control unit 120 receives, for example, output information having only the devices 30 belonging to the group S as destinations from the safety control apparatus 20, the relay apparatus 10 transmits the output signal to all the devices 30 belonging to the group S, and does not transmit the output signal to the devices 30 belonging to groups other than the group S. Therefore, an effect that the relay apparatus 10 makes the transmission of the output signal to the device 30 efficient by transmitting the output signal for each group is achieved. Further, an effect that the relay apparatus 10 can cause the safety control apparatus 20 to transmit an instruction to execute a desired process to a plurality of devices at a higher speed than in the related art is achieved.

Further, with the above configuration, (2) when the device communication control unit 110 has received, for example, the input signals from the respective devices belonging to the group P, the relay apparatus 10 transmits the input information for the entire group P to the safety control apparatus 20 and does not transmit input information corresponding to all groups other than the group P. Therefore, since the relay apparatus 10 arranges the input signals received from the plurality of devices 30 for each group and transmits the resultant signals as input information to the safety control apparatus 20, an effect that the reception of the input signals by the safety control apparatus 20 can be made efficient is achieved. Further, an effect that the relay apparatus 10 can cause the safety control apparatus 20 to execute the process corresponding to the input signals of the plurality of devices at a higher speed than in the related art is achieved.

In the safety control system 1, one or more input devices that detect stationary or non-stationary are included in the plurality of devices 30 connected in series to the device communication port 200 of the relay apparatus 10. For example, at least one of the plurality of devices 30A(1) to 30A(5) connected in series to the device communication port 200A is an input device that outputs a predetermined operation when receiving the output signal. For example, the devices 30A(1) to 30A(3) are input devices.

When the device communication control unit 110 receives the input signal indicating stationary or non-stationary from all input devices belonging to a certain group, the higher-level communication control unit 120 transmits one input information indicating stationary or non-stationary of the certain entire group to the safety control apparatus 20.

For example, when the device communication control unit 110 receives an input signal indicating "stationary" from all of the devices 30A(1) to 30A(3), the higher-level communication control unit 120 transmits the following input information to the safety control apparatus 20. That is, since all the devices 30A(1) to 30A(3) belong to the group P in the grouping definition table 330 of the storage unit 300, the higher-level communication control unit 120 transmits input information indicating "stationary" of the entire group P to the safety control apparatus 20. Further, when the device communication control unit 110 receives an input signal indicating "non-stationary" from at least one of the devices 30A(1) to 30A(3), the higher-level communication control unit 120 transmits input information indicating "non-stationary" of the entire group P to the safety control apparatus 20.

With the above configuration, the relay apparatus 10 receives "the additional information of each of the plurality of devices 30" via the device communication port 200, transmits "the additional information of each of the plurality of devices 30" to the safety control apparatus 20, and executes the following process. That is, when the relay apparatus 10 receives an input signal indicating non-stationary from one or more input devices belonging to a certain group, the relay apparatus 10 transmits one input information indicating non-stationary of the certain group to the safety control apparatus 20.

Therefore, an effect that since the relay apparatus 10 arranges the information indicated by the input signals received from each of the plurality of input devices belonging to the certain group and transmits the resultant information to the safety control apparatus 20 as the input information of the entire group, the reception of the input signal by the safety control apparatus 20 can be made efficient is achieved. Further, an effect that the relay apparatus 10 can cause the safety control apparatus 20 to execute the process corresponding to the input signals of the plurality of devices at a higher speed than in the related art is achieved.

The relay apparatus 10 includes a specifying unit 130 and executes the following process. That is, when the device communication control unit 110 receives the input signal indicating non-stationary from the device 30 that is an input device, the specifying unit 130 specifies at least one of the device 30 that has output the input signal indicating non-stationary and the group to which the device 30 that has output the input signal indicating non-stationary belongs. The higher-level communication control unit 120 transmits, to the safety control apparatus 20, information indicating at least one of the device 30 and the group specified by the specifying unit 130.

With the above configuration, an effect that the relay apparatus 10 can transmit at least one of information for specifying the device 30 that has output the input signal indicating non-stationary and information for specifying the group to which the device 30 that has output the input signal indicating non-stationary belongs, to the safety control apparatus 20 is achieved. Next, the relay apparatus 10 of which the overview has been described above will be described in detail based on FIG. 1 or the like.

(Main Configuration of Relay Apparatus)

FIG. 1 is a block diagram illustrating an example of a main configuration of the relay apparatus 10. In addition, units (for example, a power switch, a display unit, and the like included in the relay apparatus 10) that are not directly related to the embodiment are omitted from the following description and the above block diagram. However, according to the actual conditions of implementation, the relay apparatus 10 may include the omitted configuration. As illustrated in FIG. 1, the relay apparatus 10 includes a control unit 100, the device communication port 200, a storage unit 300, and a higher-level communication port 400.

The device communication port 200 is a communication port for communicating with the device 30, and is an interface to which the device communication cable 50 for communication with the plurality of devices 30(1) to 30(5) connected in series is connected. In the example illustrated in FIG. 1, the relay apparatus 10 includes the device communication port 200A to which the device communication cable 50A is connected, and the device communication port 200B to which the device communication cable 50B is connected. The plurality of devices 30A(1) to 30A(5) connected in series are connected to the device communication cable 50A. The plurality of devices 30B(1) to 30B(5) connected in series are connected to the device communication cable 50B.

The relay apparatus 10 receives the following, two types of signals from each of the plurality of devices 30(1) to 30(5)

via the single device communication port 200. That is, the relay apparatus 10 receives "input signals (for example, detection signals of the devices 30 that are input devices" and "additional Information" held by each of the plurality of devices 30 from each of the plurality of devices 30 via the single device communication port 200. For example, the relay apparatus 10 receives the input signals and the additional signals of each of the devices 30A(1) to 30A(5) via the device communication port 200A, and receives the input signals and the additional signals of each of the devices 30B(1) to 30B(5) via the device communication port 200B.

The relay apparatus 10 transmits an "output signal" indicating ON or OFF to the plurality of devices 30(1) to 30(5) respectively via the single device communication port 200. For example, the relay apparatus 10 transmits the output signal to the devices 30A(1) to 30A(5) respectively via the device communication port 200A, and transmits the output signal to the devices 30B(1) to 30B(5) respectively via the device communication port 200B.

The higher-level communication port 400 is a communication port for communicating with the safety control apparatus 20, and is an interface to which a transfer cable for communicating with the safety control apparatus 20 via the field network 40 is connected. The relay apparatus 10 transmits "input information" to the safety control apparatus 20 via the field network 40 connected to the higher-level communication port 400 and receives "output information" from the safety control apparatus 20.

Further, the relay apparatus 10 receives a request (a transmission request) for at least one of "specifying information" and "additional information" via the field network 40 connected to the higher-level communication port 400.

Here, the "specifying information" is information indicating at least one of "the device 30 that has output an input signal indicating non-stationary" and "a group to which the device 30 that has output the input signal indicating non-stationary" belongs. The information indicating "the device 30 that has output an input signal indicating non-stationary" is, for example, identification information of "the device 30 that has output an input signal indicating non-stationary", and the information indicating the "group" is, for example, identification information of the group.

Further, the "additional information" is information that is output by the device 30 and is information (data) different from the detection signal (ON/OFF signal). Details thereof will be described below with reference to FIG. 4 or the like.

The relay apparatus 10 transmits at least one of the requested "specifying information" and/or "additional information" to the safety control apparatus 20 via the field network 40 connected to the higher-level communication port 400.

The control unit 100 controls the functions of the relay apparatus 10 in an integrated manner. The illustrated control unit 100 includes, as functional blocks, the device communication control unit 110, the higher-level communication control unit 120, the specifying unit 130, and the determination unit 140.

The device communication control unit 110 controls communication with the device 30 in an integrated manner, and includes a device reception control unit 111 that controls reception from the device 30, and a device transmission control unit 112 that controls transmission to the device 30.

The device reception control unit 111 receives "the input signal and the additional information of each of the plurality of devices 30" connected to the device communication port 200 via the device communication cable 50. The device reception control unit 111 receives "the input signals of each of the plurality of devices 30" periodically or when the higher-level reception control unit 121 receives a request (a transmission request) of the "input information" from the safety control apparatus 20. A configuration in which each of the plurality of devices 30 outputs the input signal indicating "non-stationary" when the device detects the "non-stationary" state, and the device reception control unit 111 receives the input signal indicating the "non-stationary" that has been output may be adopted. When the higher-level reception control unit 121 receives a request for "additional information" from the safety control apparatus 20, the device reception control unit 111 receives "additional signals of each of the plurality of devices 30".

The device reception control unit 111 notifies the higher-level communication control unit 120 of "the additional information of each of the plurality of devices 30". In addition, the device reception control unit 111 stores "the additional information of each of the plurality of devices 30" in an additional information table 320 of the storage unit 300. The device reception control unit 111 may store "the additional information of each of the plurality of devices 30" in the additional information table 320 together with, for example, a reception time.

The device reception control unit 111 notifies the determination unit 140 of "the input signals of each of the plurality of devices 30". The device reception control unit 111 notifies the determination unit 140 of "the input signals of each of the plurality of devices 30" together with the "information related to the group to which each of the plurality of devices 30 belongs (grouping definition information)" by referring to the grouping definition table 330 of the storage unit 300. For example, the device reception control unit 111 notifies the determination unit 140 of "the input signals of the respective devices 30A(1) to 30A(5)" together with grouping definition information indicating that "the devices 30A(1) to 30A(3) belong to the group P and the devices 30A(4) and 30A(5) belong to the group Q".

The device reception control unit 111 stores "the input signals of each of the plurality of devices 30" in an input signal table 310 of the storage unit 300 and stores, for example, "the input signals of each of the plurality of devices 30" in the input signal table 310 with a reception time (a detection time). The device reception control unit 111 may store "the input signals of each of the plurality of devices 30" in the input signal table 310 together with the grouping definition information.

The device transmission control unit 112 transmits an output signal corresponding to the output information (control data) that the relay apparatus 10 has received from the safety control apparatus 20, to "each of the plurality of devices 30" connected to the device communication port 200 via the device communication cable 50". The device transmission control unit 112 transmits the output signal corresponding to the output information only to the devices 30 belonging to the specific group, and does not transmit the output signal to the devices belonging to other groups by referring to the grouping definition table 330 of the storage unit 300.

Specifically, (1) when the relay apparatus 10 receives "one output information indicating ON or OFF", which has a certain group as a destination, from the safety control apparatus 20, the device transmission control unit 112 transmits the output signal indicating ON or OFF to all the output devices belonging to the certain group. For example, when the higher-level communication control unit 120 (the higher-level reception control unit 121) receives the "output information indicating ON", which has the group S as a destination, the device transmission control unit 112 transmits the output signal indicating ON to all the devices 30 belonging to the group S. For example, when the higher-level communication control unit 120 (the higher-level reception control unit 121) receives the "output information indicating OFF", which has the group Q as a destination, the device transmission control unit 112 transmits the output signal indicating OFF to all the devices 30 belonging to the group Q.

(2) When the relay apparatus 10 receives "one output information indicating ON or OFF" for which a specific group is not specified as a destination from the safety control apparatus 20, the device transmission control unit 112 transmits the output signal indicating ON or OFF to all the output devices connected to the relay apparatus 10. For example, when the higher-level communication control unit 120 (the higher-level reception control unit 121) receives the "output information indicating ON" for which a specific group is not designated as a destination, the device transmission control unit 112 transmits the output signal indicating ON to all the devices 30 connected to the relay apparatus 10. For example, when the higher-level communication control unit 120 (the higher-level reception control unit 121) receives the "output information indicating OFF" for which a specific group is not designated as a destination, the device transmission control unit 112 transmits the output signal indicating OFF to all the devices 30 connected to the relay apparatus 10.

The higher-level communication control unit 120 controls communication with devices such as the safety control apparatus 20 included in the higher-level network, and includes a higher-level reception control unit 121 that controls reception from the safety control apparatus 20, and a higher-level transmission control unit 122 that controls transmission to the safety control apparatus 20. The higher-level communication control unit 120 can communicate with the higher-level network including the safety control apparatus 20.

The higher-level reception control unit 121 receives a request (a transmission request) for at least one of the "input information", the "specifying information", and the "additional information" from the safety control apparatus 20 via the field network 40 connected to the higher-level communication port 400.

(1) When the higher-level reception control unit 121 receives the request for "input information" from the safety control apparatus 20, the higher-level reception control unit 121 notifies the device communication control unit 110 (the device reception control unit 111) of the fact. The device communication control unit 110 (the device reception control unit 111) notified of the request for "input information" from the safety control apparatus 20 receives an input signal from the device 30.

(2) When the higher-level reception control unit 121 receives a request for "specifying information" from the safety control apparatus 20, the higher-level reception control unit 121 notifies the specifying unit 130 of the fact. The specifying unit 130 notified of the request for "specifying information" from the safety control apparatus 20 notifies the higher-level transmission control unit 122 of information indicating at least one of the specified device 30 and the group to which the specified device 30 belongs.

(3) When the higher-level reception control unit 121 receives a request for "additional information" from the safety control apparatus 20, the higher-level reception control unit 121 notifies the higher-level transmission control unit 122 of the fact. The higher-level transmission control unit 122 notified of the request for "additional information" from the safety control apparatus 20 transmits the additional information of the device 30 to the safety control apparatus 20.

The higher-level reception control unit 121 receives, from the safety control apparatus 20, "the output information indicating ON or OFF" for causing the device 30 to execute content of control determined by the safety control apparatus 20, that is, causing the device 30 to execute a predetermined process. Here, the higher-level reception control unit 121 receives "the output information for causing only the device 30 belonging to a specific group to execute a predetermined process", that is, "output information having the specific group as a destination" from the safety control apparatus 20. When the higher-level reception control unit 121 receives the "output information having the specific group as a destination", the higher-level reception control unit 121 notifies the device communication control unit 110 (in particular, the device transmission control unit 112) of the "output information" together with information indicating the "specific group". It should be noted that, when the higher-level reception control unit 121 receives "output information for which a specific group is not a destination", that is, "output information for which the group as a destination is not designated", the higher-level reception control unit 121 notifies the device communication control unit 110 (in particular, the device transmission control unit 112) of the "output information" together with information indicating that "the group as a destination is not designated".

The higher-level transmission control unit 122 transmits at least one of the "input information", the "specifying information", and the "additional information" to the safety control apparatus 20 based on the request (the transmission request) that the higher-level reception control unit 121 has received from the safety control apparatus 20.

(1) The higher-level transmission control unit 122 transmits information indicated by all of the "input signals of each of the plurality of devices 30 connected in series to the device communication port 200" as "input information" to the safety control apparatus 20. Here, the higher-level transmission control unit 122 transmits the "information indicated by all the input signals of the respective devices 30 belonging to a specific group", that is, the "input information indicating stationary or non-stationary of the entire specific group" to the safety control apparatus 20. For example, when the device communication control unit 110 (the device reception control unit 111) receives the input signal indicating "stationary" from all the devices 30 belonging to the group P, the higher-level transmission control unit 122 transmits the input information indicating "stationary" of the group P to the safety control apparatus 20. When the device communication control unit 110 (the device reception control unit 111) receives the input signal indicating "non-stationary" from at least one of the devices 30 belonging to the group P, the higher-level transmission control unit 122 transmits the input information indicating "non-stationary" of the group P to the safety control apparatus 20.

(2) The higher-level transmission control unit 122 transmits "information (specifying information) indicating at least one of the device 30 specified by the specifying unit 130 and the group to which the specified device 30 belongs" notified of by the specifying unit 130, to the safety control apparatus 20.

(3) When the higher-level reception control unit 121 receives the request for "additional information" from the safety control apparatus 20, the higher-level transmission control unit 122 transmits the additional information of the device 30 acquired as will be described below to the safety control apparatus 20. That is, the higher-level transmission control unit 122 acquires the additional information of the device 30 by referring to the additional information table 320, or causes the device reception control unit 111 to receive the additional information of the device 30 to acquire the additional information of the device 30 from the device reception control unit 111.

In addition, the higher-level transmission control unit 122 may transmit at least one of the "input information" and the "specifying information" to the safety control apparatus 20 not only in a case in which the higher-level reception control unit 121 has received a request from the safety control apparatus 20, but also in the following cases. That is, when the higher-level transmission control unit 122 has detected that at least one of the devices 30 is in the "non-stationary" state, the higher-level transmission control unit 122 may transmit at least one of the "input information" and the "specifying information" to the safety control apparatus 20. In other words, when the device reception control unit 111 receives the input signal indicating "non-stationary" from at least one of the devices 30, the higher-level transmission control unit 122 may transmit at least one of the "input information" and the "specifying information" to the safety control apparatus 20.

When the device communication control unit 110 (the device reception control unit 111) receives the input signal indicating non-stationary (OFF) from at least one of the plurality of devices 30, the specifying unit 130 specifies the device 30 that has output the input signal indicating non-stationary. For example, the specifying unit 130 first acquires "the input signals of each of the plurality of devices 30 (for example, the latest input signals)" from the device communication control unit 110. The specifying unit 130 may acquire "the input signals of each of the plurality of devices 30 (for example, the latest input signals)" by referring to the input signal table 310 in the storage unit 300.

Then, the specifying unit 130 specifies (1) the device 30 that has output the input signal indicating "non-stationary" (for example, the input signal indicating "OFF") when there is an input signal indicating non-stationary among the acquired input signals. The specifying unit 130 notifies the higher-level communication control unit 120 of the information indicating the specified "the device 30 (for example, a device 30(3)) that has output an input signal indicating non-stationary. The specifying unit 130 ends the process when there is no input signal indicating non-stationary among the notified input signals.

The specifying unit 130 may further specify the group to which the specified "the device 30 (for example, a device 30(3)) that has output an input signal indicating non-stationary" belongs by referring to the grouping definition table 330 of the storage unit 300.

In addition, the specifying unit 130 may refer to the input signal table 310, and specify the device 30 that has output the input signal indicating non-stationary, for example, when there is the input signal indicating non-stationary among the "input signals of each of the plurality of devices 30" of which reception times are the same. The specifying unit 130 may notify the higher-level communication control unit 120 of the information indicating at least one of "the device 30 that has output the input signal indicating non-stationary" and "the group to which the device 30 belong" specified by referring to the input signal table 310, that is, the specifying information.

When the higher-level reception control unit 121 notifies the specifying unit 130 of the request for "specifying information" from the safety control apparatus 20, the specifying unit 130 notifies the higher-level communication control unit 120 of the specifying information. In addition, when the specifying unit 130 is notified of a determination result of the determination unit 140 that "there is an input signal indicating non-stationary among the input signals of each of the plurality of devices 30" (for example, receives a notification from the higher-level communication control unit 120), the specifying unit 130 may notify the higher-level communication control unit 120 of the specifying information.

The determination unit 140 determines whether the device communication control unit 110 has received the input signal indicating "non-stationary" from at least one of the plurality of devices 30. When the determination unit 140 determines that the device communication control unit 110 has received the input signal indicating "non-stationary" from at least one of the plurality of devices 30, the determination unit 140 causes the higher-level communication control unit 120 (the higher-level transmission control unit 122) to transmit the input information indicating "non-stationary" to the safety control apparatus 20.

The determination unit 140 determines whether or not the input signal indicating "non-stationary" has been received from at least one of the devices 30 belonging to the specific group by referring to the grouping definition table 330 of the storage unit 300. When the determination unit 140 determines that the input signal indicating "non-stationary" has been received from at least one of the devices 30 belonging to the specific group, the determination unit 140 causes the higher-level transmission control unit 122 to transmit the input information indicating "non-stationary" of the specific group to the safety control apparatus 20. When the determination unit 140 determines that the input signal indicating "stationary" has been received from all the devices 30 belonging to the specific group, the determination unit 140 causes the higher-level transmission control unit 122 to transmit input information indicating "stationary" of the specific group to the safety control apparatus 20.

Specifically, the determination unit 140 first acquires "the input signals of each of the plurality of devices 30 belonging to the specific group" from the device communication control unit 110. The determination unit 140 then determines whether or not there is an input signal indicating non-stationary among the acquired "input signals of each of the plurality of devices 30 belonging to the specific group". The determination unit 140 notifies the higher-level transmission control unit 122 of a determination result, and causes the higher-level transmission control unit 122 to transmit the input information indicating "stationary" or "non-stationary" of the "specific group" to the safety control apparatus 20.

Each functional block of the control unit 100 described above is realized, for example, by a central processing unit (CPU) or the like reading a program stored in a storage device (storage unit 300) realized by a read only memory (ROM), a non-volatile random access memory (NVRAM) or the like into a random access memory (RAM; not illustrated) or the like and executing the program.

The storage unit 300 stores various data to be used by the relay apparatus 10. The storage unit 300 stores (1) a control program, (2) an OS program, and (3) an application program for executing various functions, which are executed by the relay apparatus 10, and (4) various data to be read when the application program is executed. The above data (1) to (4) are stored, for example, a non-volatile storage device, such as a read only memory (ROM), a flash memory, an erasable programmable ROM), an EEPROM (registered trademark;

electrically EPROM), or a hard disc drive (HDD). Further, the input signal table 310, the additional information table 320, and the grouping definition table 330 are stored in the storage unit 300.

The "input signals of each of the plurality of devices 30(1) to 30(3)" received by the device communication control unit 110 are stored in the input signal table 310. For example, the "input signals of each of the plurality of devices 30(1) to 30(3)" are stored together with the reception time.

The "additional information of each of the plurality of devices 30(1) to 30(3)" received by the device communication control unit 110 are stored in the additional information table 320. For example, the "additional information of each of the plurality of devices 30(1) to 30(3)" are stored together with the reception time.

Grouping information in which groups to which each of the plurality of devices 30 connected in series to the device communication port 200 belong have been defined is stored in the grouping definition table 330. The grouping information stored in the grouping definition table 330 may be information created by the user. For example, the user can create or change the grouping information using an HMI or the like connected to the relay apparatus 10. The user may also create and change the grouping information in the safety control apparatus 20 using the HMI or the like connected to the safety control apparatus 20, and the relay apparatus 10 may acquire the created and changed grouping information from the safety control apparatus 20.

FIG. 4 is a diagram illustrating an overview of the additional information and an example of a data structure of the grouping definition table. In FIG. 4, the part (A) is a diagram illustrating an example of the additional information of the device 30 and an example of a use of the additional information in association with each other. The "additional information of each of the plurality of devices 30(1) to 30(3)" is information different from the information indicated by the input signal output from each of the plurality of devices 30(1) to 30(3). The additional information of the device 30 is, for example, "information of which the amount of information is larger than one bit" held by the device 30, and includes the following content. That is, the additional information of the device 30 includes, for example, information such as "product type", "serial No./lot No.", "connection position", "comment", "power supply voltage value", "energization time", "number of operations", "replacement date", and "ON/OFF threshold value".

The "product type" is used, for example, to specify a component (the device 30) to be replaced at the time of replacement, and is used to prevent a replacement error. The "serial No./lot No." can be used, for example, for analysis of characteristics at the time of failure, and is mainly used at the time of making an inquiry to a manufacturer of the device 30. The "connection position" is used, for example, to specify the component (device 30) together with the "product type", and is used to prevent the replacement error. The "comment" is, for example, a free note of the user for the device 30, and there are various use methods. For example, the "comment" can be used as a memorandum by describing a memo such as "a switch of a door on the north side of Unit 1" as a "comment" of the device 30 for an installation place of the device 30. The "power supply voltage value" can be used, for example, to monitor and warn stability of a power supply with an operation power supply voltage at the time of operation. The "energization time" can be used as an indicator as to "how much the device is driven", and can be used, for example, to specify a replacement time period of the device 30 from the "energization time" and notify of the replacement time. The "number of operations" indicates "how many ON/OFF has been made", and can be used, for example, to specify the replacement time period from the "number of operations" and notify of the replacement time. The "replacement date" indicates "when the replacement has been made", and can be used, for example, to specify a next replacement time period from the "replacement date" and notify of the next replacement period. The "ON/OFF threshold value" indicates analog data of a device (the device 30) for which ON/OFF of the signal (input signal) is determined. For example, a wear condition and a contamination condition of the device 30 can be specified from the "ON/OFF threshold value" and used to specify a maintenance (replacement, cleaning, or the like) time period.

Examples of the additional information of the device 30 can include setting information of the device 30, in addition to those illustrated in FIG. 4. For example, examples of the setting information in a case in which the device 30 is a photoelectric sensor may include "a key lock setting that defines whether or not a setting by a hardware switch included in the photoelectric sensor is to be locked", "a Light ON/Dark ON setting that defines whether an ON signal is to be output when light is detected or an ON signal is to be output when not light is detected", and "an ON (OFF) delay timer setting that defines a standby time until an ON signal or an OFF signal is output after output conditions of the ON signal or the OFF signal are satisfied.

Grouping information is stored in the grouping definition table 330 illustrated in the part (B) of FIG. 4, and the grouping information defines a group to which each of the plurality of devices 30 connected in series to the device communication port 200 belongs. In the grouping definition table 330 illustrated in FIG. 4, the following content are defined as groups to which the devices 30A(1) to 30A(5) and the devices 30B(1) to 30B(5) belong. That is, it is defined that the devices 30A(1) to 30A(3) belong to the group P, the devices 30A(4) and 30A(5) belong to the group Q, the devices 30B(1) to 30B(3) belong to the group S, and the device 30B(4) to 30B(5) belong to the group T.

It should be noted that the device 30 serving as an input device and the device 30 serving as an output device may be included among the devices 30 belonging to the same group. For example, the devices 30A(1) to 30A(2) among the devices 30A(1) to 30A(3) belonging to the group P may be input devices and the device 30A(3) may be the output device. Further, all the devices 30 belonging to the same group may be input devices or output devices. For example, the devices 30A(1) to 30A(3) belonging to the group P among the plurality of devices 30A(1) to 30A(5) are all input devices, and the devices 30A(4) and 30A(5) belonging to the group Q may be all output devices.

Further, in the grouping definition table 330 illustrated in the part (B) of FIG. 4, the plurality of devices 30 connected in series to the device communication port 200 are divided into a plurality of groups. However, it is not indispensable that the plurality of devices 30 connected in series to the device communication port 200 are divided into a plurality of groups. For example, all of the devices 30A(1) to 30A(5) and the devices 30B(1) to 30B(5) may belong to the same group. Further, the devices 30A(1) to 30A(3) among the devices 30A(1) to 30A(5) may belong to the group P, the devices 30A(4) and 30A(5) may belong to the group Q, and the devices 30B(1) to 30B(5) may all belong to the group S.

(Flow of Process Executed in System)

Figure 5:
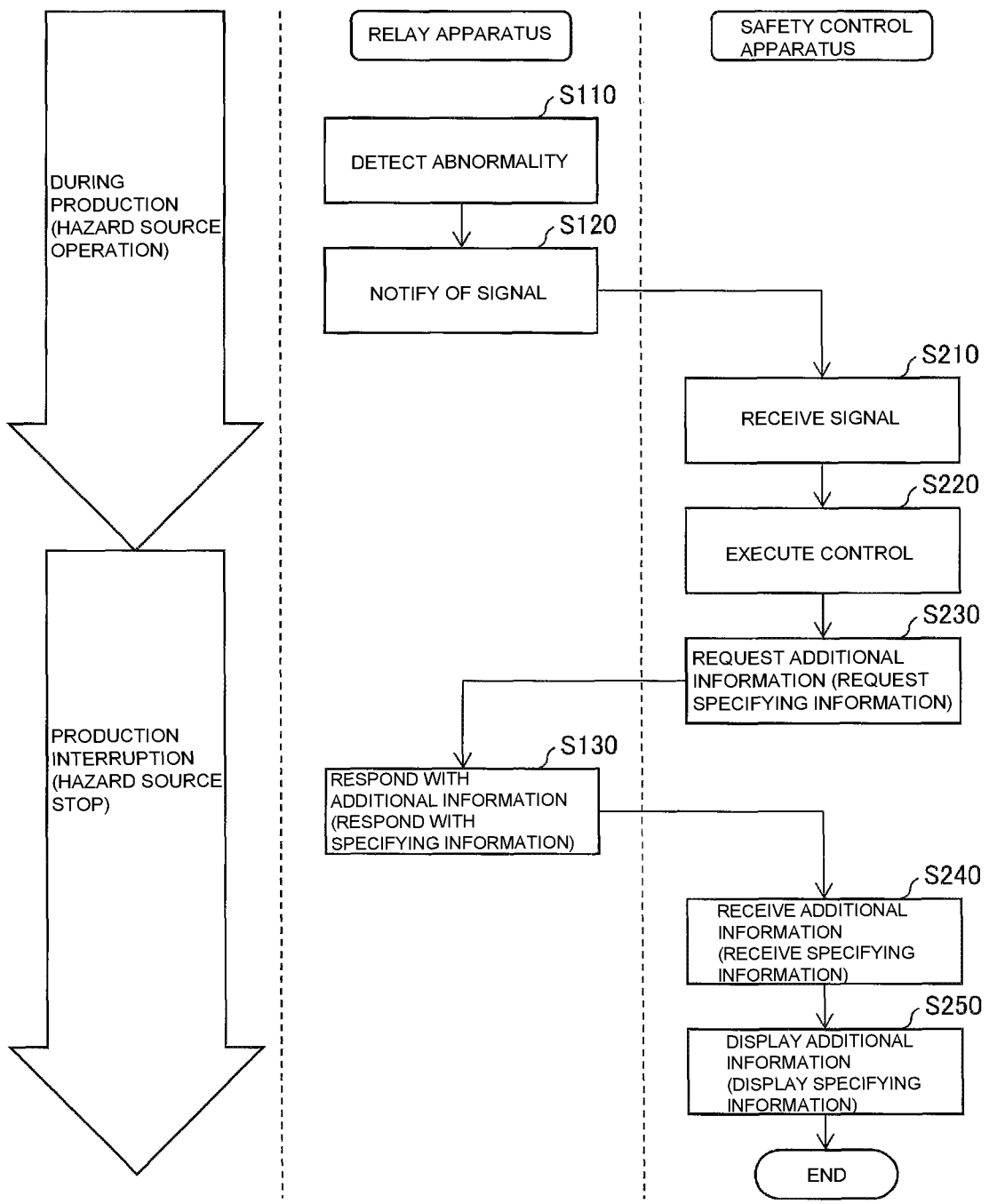
FIG. 5 is a flowchart illustrating an example of a process that is executed in the safety control system of FIG. 2.

FIG. 5 is a flowchart illustrating an example of a process that is executed in the safety control system 1. An example of a process that is executed in the safety control system 1 including the relay apparatus 10, the safety control apparatus 20, and the device 30 described above will be described with reference to FIG. 5.

In the example illustrated in FIG. 5, the relay apparatus 10 has detected abnormality (non-stationary) during an operation of a hazard occurrence portion, that is, during driving (during production) of the driving apparatus that is a target of the safety control operation in the safety control apparatus 20 (S110). Specifically, the determination unit 140 determines that there is an input signal indicating non-stationary (OFF) in "the input signals of each of the plurality of devices 30".

The relay apparatus 10 that has detected the abnormality (non-stationary) notifies the safety control apparatus 20 of a signal indicating that execution of the safety control operation is necessary (S120). Specifically, the higher-level communication control unit 120 transmits the "input information indicating non-stationary (OFF)" to the safety control apparatus 20.

When the safety control apparatus 20 receives the signal transmitted by the higher-level communication control unit 120 of the relay apparatus 10 (S210), that is, when the safety control apparatus 20 receives the "input information indicating non-stationary (OFF)", the safety control apparatus 20 executes the control (the safety control operation) (S220). Through the execution of the safety control operation in the safety control apparatus 20, a hazard occurrence portion (that is, a driving apparatus) stops and, for example, production is temporarily suspended.

After the safety control apparatus 20 executes the safety control operation, the safety control apparatus 20 requests additional information (specifying information) (S230), that is, transmits a request for the additional information (the specifying information) to the relay apparatus 10. In addition, although a process in a case in which the safety control apparatus 20 has transmitted a request of specifying information to the relay apparatus 10 will be described hereinafter, substantially the same applies to a process in a case in which the safety control apparatus 20 transmits a request of additional information to the relay apparatus 10.

When the higher-level communication control unit 120 of the relay apparatus 10 receives the request for the specifying information, the relay apparatus 10 executes a response process for the specifying information (S130). Specifically, the specifying unit 130 of the relay apparatus 10 specifies at least one of the device 30 that has output the input signal indicating non-stationary (OFF) and the group to which the device 30 that has output the input signal indicating non-stationary belongs. The specifying unit 130 notifies the higher-level communication control unit 120 of at least one of the specified device 30 and the specified group. The higher-level communication control unit 120 transmits information indicating at least one of the device 30 and the group specified by the specifying unit 130 to the safety control apparatus 20.

In addition, when the higher-level communication control unit 120 of the relay apparatus 10 receives the request for additional information, the higher-level communication control unit 120 transmits the additional information of the device 30 acquired as will be described below to the safety control apparatus 20. That is, the higher-level communication control unit 120 refers to the additional information table 320 to acquire the additional information of the device 30 or causes the device communication control unit 110 to receive the additional information of the device 30 to acquire the additional information of the device 30 from the device communication control unit 110.

The safety control apparatus 20 receives at least one of the additional information and the specifying information from the relay apparatus 10 (S240), and displays, in the own apparatus, the at least one of the additional information and the specifying information that has been received or causes, for example, an HMI connected to the own apparatus to display the information (S250).

The relay apparatus 10 includes the storage unit 300 that stores the grouping definition table 330 (grouping information) in which the groups to which each of the plurality of devices 30 connected in series to the device communication port 200 belong is defined, and executes the following control method. That is, as described with reference to FIG. 5, the control method to be executed by the relay apparatus 10 includes a device communication control step of communicating with each of the plurality of devices 30 connected in series via the device communication port 200, and a higher-level communication control step of controlling communication with the safety control apparatus 20.

The device communication control step includes (1) a process of "reception of additional information from the device 30", (2) a process of "reception of an input signal from the device 30", and (3) a process of "transmission of the output signal to the device 30" in the device communication control unit 110.

The higher-level communication control step includes (1) a process of "transmission of at least one of the additional information and the specifying information of the device 30 to the safety control apparatus 20" (S130), (2) a process of "transmission of the input information to the safety control apparatus 20 (S120), and (3) a process of "transmission of the output signal to the device 30 in the higher-level communication control unit 120.

In the higher-level communication control step, the additional information held by each of the plurality of devices 30 received in the device communication control step can be transmitted to the safety control apparatus 20. The control method to be executed by the relay apparatus 10 is at least one of the following.

That is, at least one of (1) transmission of the output signal indicating ON or OFF to all the devices belonging to a certain group, which is executed in the device communication control step when one output information indicating ON or OFF is received from the safety control apparatus 20 in the higher-level communication control step, and (2) transmission of one input information indicating stationary or non-stationary of the entire certain group to the safety control apparatus 20, which is executed in the higher-level communication control step when the input signal indicating stationary or non-stationary is received from each of the devices 30 belonging to the certain group in the device communication control step is executed.

According to the control method, it is possible to transmit "the additional information of each of the plurality of devices 30" received via the device communication port 200 to the safety control apparatus 20, and the following, at least one process is executed. That is, at least one of (1) transmission of the output signal for all the devices belonging to a certain group, which is executed when the output information is received from the safety control apparatus 20, and (2) transmission of the input information of the entire certain group, which is executed when the input signal is received from each of the devices belonging to the certain group is executed.

Here, the slave apparatus of the related art includes a plurality of communication ports to which a plurality of input devices are respectively connected, and the plurality of input devices are connected in parallel to the plurality of communication ports and receives additional information and input signals of each of a plurality of devices. Therefore, as the number of input devices to be installed increases, it is necessary to add and prepare the same number of communication ports as the number of increased input devices, and costs related to facility investment thus tend to increase.

On the other hand, in the control method, "the additional information and the input signals of each of the plurality of devices 30" are received via the device communication port 200. Therefore, in the control method, the relay apparatus 10 may include only single communication port for receiving "the additional information and the input signals of each of the plurality of devices 30", and an effect that costs for the communication port and the like can be suppressed as compared with the control method of the slave apparatus of the related art is achieved.

Further, in the master-slave control system of the related art, the master apparatus transmits (1) the output signal indicating ON or OFF to the plurality of devices respectively, or receives (2) the input signal output by the plurality of devices respectively.

On the other hand, in the above control method, at least one of (1) transmission of the output signal for all the devices belonging to a certain group, which is executed when the output information is received from the safety control apparatus 20, and (2) transmission of the input information of the entire certain group, which is executed when the input signal is received from each of the devices belonging to the certain group is executed.

Therefore, in the control method, it is possible to (1) transmits the output signal to all the devices belonging to a certain group only by the safety control apparatus 20 transmitting the one output information to the slave apparatus having the above configuration. That is, the control method achieves an effect that the transmission of the output signal to the device 30 is made efficient, and the safety control apparatus 20 can transmit an instruction to execute a desired process to the plurality of devices at a higher speed than in the related art.

Further, in the control method, it is possible to (2) execute a process corresponding to all the input signals of all the devices belonging to a certain group only by the safety control apparatus 20 receiving only one input information from the slave apparatus having the above configuration. That is, the control method achieves an effect that the reception of the input signal by the safety control apparatus 20 is made efficient, and the safety control apparatus 20 can be caused to execute the process corresponding to the input signals of the plurality of devices at a higher speed than in the related art.

MODIFICATION EXAMPLE

The safety control system 1 is a master-slave control system in which one relay apparatus 10 and one safety control apparatus 20 communicate with each other. However, in the master-slave control system including the safety control apparatus 20 serving as a master apparatus and the relay apparatus 10 serving as a slave apparatus, it is not indispensable for the one relay apparatus 10 and the one safety control apparatus 20 to perform communication.

Figure 6:
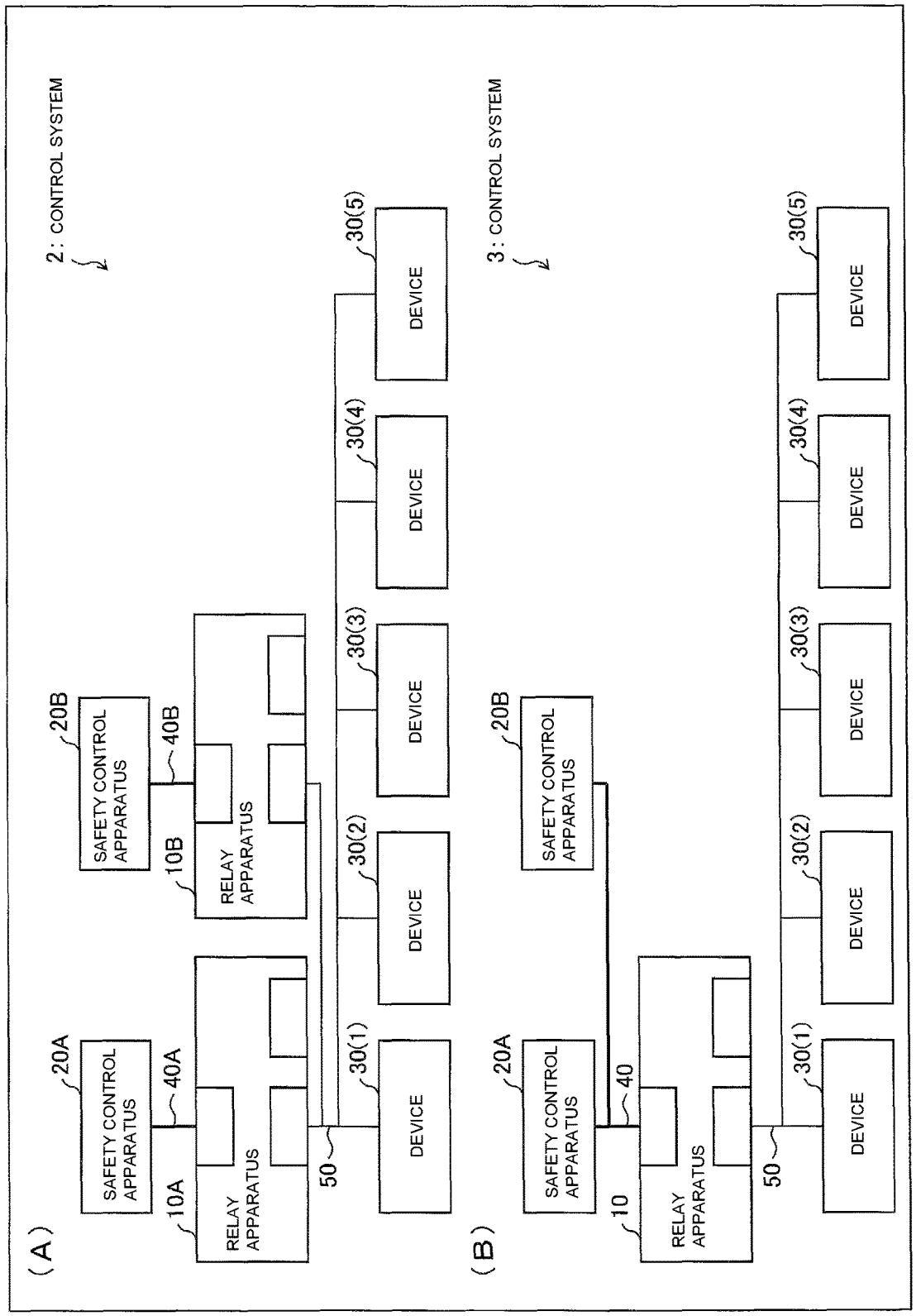
FIG. 6 is a diagram illustrating an example of a master-slave control system including the relay apparatus of FIG. 1, which is different from that illustrated in FIG. 2.

FIG. 6 is a diagram illustrating an example of units other than the safety control system 1 in the master-slave control system including the safety control apparatus 20 serving as a master apparatus and the relay apparatus 10 serving as a slave apparatus. The control system 2 illustrated in the part (A) of FIG. 6 is a master-slave control system including (1) a safety control apparatus 20A serving as a master apparatus, a relay apparatus 10A serving as a slave apparatus connected to the safety control apparatus 20A via a field network 40A, and (2) a safety control apparatus 20B serving as a master apparatus, and a relay apparatus 10B serving as a slave apparatus connected to the safety control apparatus 20B via a field network 40B. Further, the control system 3 illustrated in the part (B) of FIG. 6 is a master-slave control system including (1) the safety control apparatuses 20A and 20B serving as master apparatuses, and the relay apparatus 10 serving as a slave apparatus connected to the safety control apparatuses 20A and 20B via the field network 40.

In addition, the safety control apparatuses 20A and 20B illustrated in FIG. 6 are the same as the safety control apparatus 20 in the safety control system 1, and the field networks 40A and 40B are the same as the field network 40 in the safety control system 1. Further, the relay apparatuses 10A and 10B are the same as the relay apparatus 10 in the safety control system 1. Therefore, details of the safety control apparatuses 20A and 20B, the field networks 40A and 40B, and the relay apparatuses 10A and 10B will be abbreviated.

In the control system 2, the relay apparatus 10A transmits the additional information of each of the plurality of devices 30 to the safety control apparatus 20A. The relay apparatus 10B transmits the input information corresponding to the input signals of each of the plurality of devices 30 to the safety control apparatus 20B. The relay apparatus 10B transmits the output signal corresponding to the output information from the safety control apparatus 20B to the plurality of devices 30.

In the control system 3, the relay apparatus 10 transmits the additional information of each of the plurality of devices 30 to the safety control apparatus 20A. The relay apparatus 10 transmits the input information corresponding to the input signals of each of the plurality of devices 30 to the safety control apparatus 20B. The relay apparatus 10 transmits the output signal corresponding to the output information from the safety control apparatus 20B to the plurality of devices 30.

As illustrated in FIG. 6, in the master-slave control system including the relay apparatus 10 serving as a slave apparatus, a plurality of master apparatuses communicating with the relay apparatus 10 may be included, and a plurality of relay apparatuses 10 serving as slave apparatuses may be included. The master apparatus using the additional information output by the device 30, and the master apparatus using the input signal output by the device 30 (more accurately, the input information corresponding to the input signal) are the same one master apparatus or may be two or more different master apparatuses.

[Supplements]

The safety control apparatus 20 performs sensing of a hazard occurrence portion related to the driving apparatus or the like and control of the hazard occurrence portion so that human life, human bodies, and products are not damaged due to the operation of the driving apparatus (the production system) of which the driving is controlled by the safety control apparatus 20. As a means for realizing such an object, the safety control apparatus 20 executes the safety control operation such as OFF of power to the driving apparatus and suppression of driving (power) of the driving apparatus when the "non-stationary" state (abnormality) is detected. More specifically, for example, when the "non-stationary" state (abnormality) such as "a foreign body (including a human body) or malfunction or failure of the driving apparatus" has been detected for the hazard occurrence portion, the safety control apparatus 20 executes the safety control operation. However, an excessive operation of the safety control apparatus 20, in other words, the execution of the safety control operation that is not necessarily indispensable tends to work negatively in terms of a rate of operation and productivity of the production system.

Here, the safety control apparatus 20 has the following characteristics. That is, when the device 30 (the device 30 serving as an input device that detects stationary or non-stationary) itself fails or malfunctions, the safety control apparatus 20 cannot detect the "non-stationary" state using the device 30. Therefore, the safety control apparatus 20 treats the failure or malfunction of the device 30 itself as the "non-stationary" state and executes the safety control operation, in order to ensure reliable safety.

That is, there is the following dilemma in the safety control operation by the safety control apparatus 20. That is, the execution of the safety control operation by the safety control apparatus 20 tends to work negatively in terms of the rate of operation of the production system, and the like, and therefore, it is desired to execute the safety control operation only when "power OFF and suppression of power" are really needed. However, the safety control apparatus 20 executes the safety control operation in order to ensure reliable safety even in a case that the "power OFF and suppression of the power" are not actually indispensable, such as failure or malfunction of the device 30 itself.

In order to eliminate such a dilemma, for example, there may be a countermeasure method as shown below. That is, an example of the method may include a countermeasure method such as "using a highly reliable device 30" in order to prevent execution of the safety control operation by the safety control apparatus 20 based on failure/malfunction of the device 30 itself. Further, a countermeasure method such as "replacing the device 30 before malfunction or malfunction" has been examined in order to avoid troubles even when the device 30 suddenly fails or malfunctions.

Examples of a specific method of "replacing the device 30 before failure or malfunction" can include (1) a method of planning a replacement by relying on a notary value and operation guarantee by a manufacturer, and (2) a method of predicting failure in advance based on the number of operations of the device, operation results, and the like. One of schemes for (2) "predicting the failure of the device 30 in advance based on the number of operations, the operation results of the device 30, and the like" is "informatization" and is, for example, use of additional information or the like that the device 30 can output.

Specifically, it is possible to perform predictive maintenance by ascertaining temporal change in data that is output by the device 30 (for example, an input signal such as a detection signal of the device 30, and analog data such as additional information held by the device 30). For example, it is possible to perform the predictive maintenance using the "bathtub curve" indicated by the data that is output by the device 30, as illustrated in FIG. 7.

Figure 7:
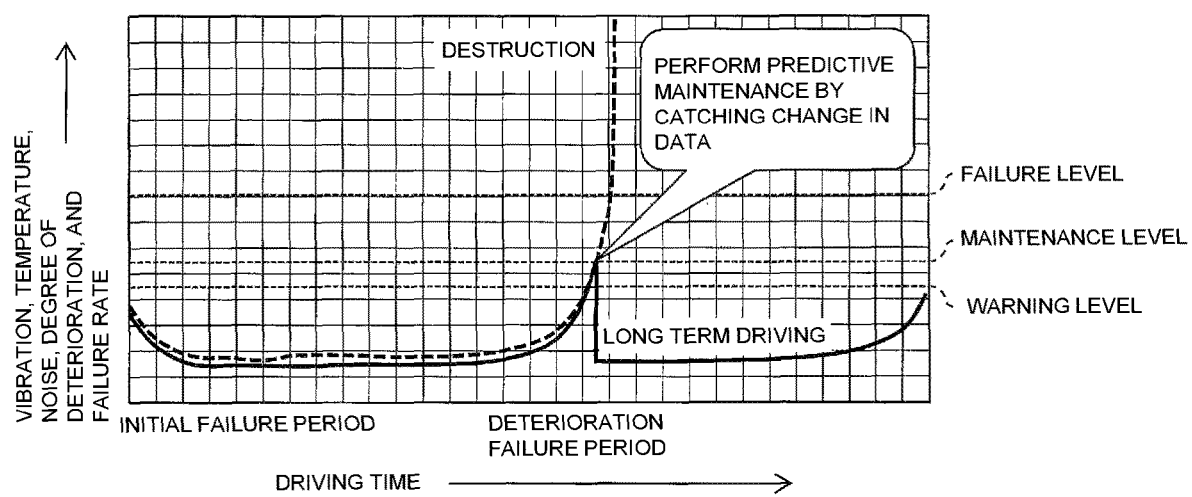
FIG. 7 is a diagram illustrating an example of a method of performing predictive maintenance using a bathtub curve indicated by data output from a device.

FIG. 7 is a diagram illustrating an example of a method of performing predictive maintenance using a bathtub curve indicated by data output by the device 30. In the "bathtub curve indicated by the data output by the device 30" illustrated in FIG. 7, an "driving and operation time" of the device 30 is indicated on a horizontal axis (a start time of driving and operation is a "0" point), "data of vibration, temperature, noise, or the like" and "a degree of deterioration and a failure rate" output by the device 30 are indicated on a vertical axis. As illustrated in FIG. 7, in the bathtub curve of the device 30, when a failure level, a maintenance level, and a warning level are set in parallel with the horizontal axis from the top, it becomes possible to perform the predictive maintenance. It should be noted that the maintenance level indicates "a level at which maintenance is to be executed", and the warning level indicates "a level at which a time period to perform the maintenance is approaching".

The relay apparatus 10 can specify a device in which it is easy for the "non-stationary" state such as failure to occur in the production system, specify a device in which it is easy for the "non-stationary" state such as hazard (abnormality) to occur, and ascertain characteristics of those devices through informatization of the device 30.

That is, the relay apparatus 10 realizes three items including (1) visualization of a bottleneck, (2) improvement of troubleshooting, and (3) prior prevention of troubles in the production system through informatization of the device 30 and the like, and improves a rate of operation (an operating ratio) and productivity of the production system.

(Note Related to Safety Control Apparatus)

The safety control apparatus 20 has a safety control function, and executes a safety control operation when receiving the input information indicating non-stationary. For example, when the safety control apparatus 20 receives the input information indicating non-stationary, the safety control apparatus 20 executes the safety control operation such as a control operation for causing the driving apparatus to stop driving.

Here, for the safety control, when at least one of the plurality of devices 30 outputs an input signal indicating an "non-stationary (for example, hazard or abnormality)", the safety control apparatus 20 needs to execute the above safety control operation such as causing the driving apparatus to stop driving. That is, for the safety control, it is not necessary to distinguish between "stationary" and "non-stationary" of the input signals transmitted by the plurality of devices 30 respectively. When at least one device 30 outputs an input signal indicating "non-stationary", the safety control apparatus 20 needs to execute the safety control operation. Further, when all the devices 30 output an input signal indicating "stationary", the safety control apparatus 20 does not need to execute the safety control operation.

For example, when all the input devices belonging to group P output the input signals indicating "stationary", the safety control apparatus 20 can confirm that "non-stationary" is not detected in the group P. When at least one of the input devices belonging to the group P outputs the input signal indicating "non-stationary", the safety control apparatus 20 can confirm that "non-stationary" is detected in the group P.

With the relay apparatus 10, for example, one safety control apparatus 20 can receive additional information of each of the plurality of devices 30. Further, an effect that with the relay apparatus 10, for example, one safety control apparatus 20 can receive input information corresponding to the information indicated by all of the input signals of each of the plurality of devices 30 and determine whether or not to execute the safety control operation is achieved.

In the safety control system 1, when the safety control apparatus 20 does not receive the input information indicating stationary from the relay apparatus 10 in response to a request for input information sent to the relay apparatus 10, the safety control apparatus 20 executes a predetermined control operation (for example, safety control operation such as causing the driving apparatus to stop driving).

That is, (1) when the safety control apparatus 20 receives input information indicating non-stationary from the relay apparatus 10 in response to the request for input information sent to the relay apparatus 10, the safety control apparatus 20 executes the predetermined control operation. Further, (2) when the safety control apparatus 20 does not receive the input information itself from the relay apparatus 10 in response to the request for input information sent to the relay apparatus 10, the safety control apparatus 20 executes the predetermined control operation. For example, when the safety control apparatus 20 does not receive the input information itself from the relay apparatus 10 in response to the request for input information due to occurrence of an event such as a failure in the relay apparatus 10 itself or occurrence of abnormality or the like in a communication path, the safety control apparatus 20 executes the predetermined control operation.

Therefore, an effect that, when the safety control system 1 confirms safety, for example, by the safety control apparatus 20 receiving the input information indicating stationary, the safety control system 1 can execute a predetermined control operation such as causing the driving apparatus to stop driving (1) when the safety control apparatus 20 has received the input information indicating non-stationary or (2) when the safety control apparatus 20 cannot receive the input information itself and cannot confirm the safety is achieved.

As illustrated in FIG. 2, the safety control apparatus 20 may be a slave apparatus in the higher-level master-slave control system 1000, which is a master-slave control system at a higher level. In that case, the safety control apparatus 20 transmits the additional information to the control apparatus 90, which is the higher-level master apparatus that manages data transfer in the higher-level master-slave control system 1000. With the above configuration, an effect that the safety control apparatus 20 can transmit the additional information to the control apparatus 90 in the higher-level master-slave control system is achieved.

[Example of Realization Using Software]

The relay apparatus 10 may be realized by a computer, which includes a communication port to which a communication cable for communicating with a plurality of devices 30 connected in series is connected, reading and executing "an information processing program for causing the computer to function as the relay apparatus 10, which is an information processing program for causing the computer to function each unit.

For example, control blocks (in particular, the device communication control unit 110, the higher-level communication control unit 120, the specifying unit 130, and the determination unit 140) of the relay apparatus 10 may be realized by a logic circuit (hardware) formed in an integrated circuit (IC chip) or the like or may be realized by software using a central processing unit (CPU).

In the latter case, the relay apparatus 10 includes, for example, a CPU that executes instructions of a program that is software that realizes each function, a read only memory (ROM) or a storage device in which the above program and various data are recorded so that the program and the data can be read by a computer (or the CPU) (these are referred to as a "recording medium"), and a random access memory (RAM) for developing the program. The object of the present invention is achieved by the computer (or the CPU) reading the program from the recording medium and executing the program. As the recording medium, a "non-transitory tangible medium", such as a tape, a disk, a card, a semiconductor memory, a programmable logic circuit, can be used. Further, the program may be supplied to the computer via any transfer medium (a communication network, broadcast waves, or the like) capable of transferring the program. It should be noted that an aspect of the present invention can also be realized in the form of a data signal embedded in carrier waves in which the program is embodied by electronic transfer.

(Additional Matters)

In order to solve the aforementioned problems, a slave apparatus according to an aspect of the present invention is a slave apparatus connected to a controller that is a master apparatus, the slave apparatus including a device communication control unit that communicates with each of a plurality of devices connected in series via a single communication port; a higher-level communication control unit that controls communication with the controller, and a storage unit that stores grouping information that defines groups to which each of the plurality of devices belongs. The higher-level communication control unit is able to transmit, to the controller, additional information held by each of the plurality of devices received by the device communication control unit, and executes at least one of (1) transmission of the output signal indicating ON or OFF to all the devices belonging to a certain group, which is executed by the device communication control unit when the higher-level communication control unit receives one output information indicating ON or OFF from the controller, and (2) transmission of one input information indicating stationary or non-stationary of the entire certain group to the controller, which is executed by the higher-level communication control unit when the device communication control unit receives the input signal indicating stationary or non-stationary from each of the devices belonging to the certain group.

With the above configuration, the slave apparatus can transmit the "additional information of each of the plurality of devices" received via a single communication port to the controller, and executes at least one of the following processes. That is, the slave apparatus executes at least one of (1) transmission of an output signal to all the devices belonging to a certain group, which is executed when the output information is received from the controller, and (2) transmission of the input information of the entire certain group, which is executed when the input signal is received from each of the devices belonging to the certain group.

Here, the slave apparatus of the related art includes a plurality of communication ports to which a plurality of respective input devices is connected, and the plurality of input devices is connected in parallel to the plurality of communication ports and receives additional information and input signals of each of a plurality of devices. Therefore, as the number of input devices to be installed increases, it is necessary to add and prepare the same number of communication ports as the number of increased input devices, and costs related to facility investment thus tend to increase.

On the other hand, the slave apparatus having the above configuration receives "the additional information and the input signal of each of the plurality of devices" via the single device communication port. Therefore, an effect that the slave apparatus needs only to prepare the single device communication port for receiving "the additional information and the input signal of each of the plurality of devices", and costs for the communication port or the like can be suppressed as compared with the slave apparatus of the related art is achieved.

Further, in the master-slave control system of the related art, the master apparatus transmits (1) the output signal indicating ON or OFF to the plurality of devices respectively, or receives (2) the input signal output by the plurality of devices respectively.

On the other hand, the slave apparatus having the above configuration executes at least one of (1) transmission of an output signal to all the devices belonging to the certain group, which is executed when the output information is received from the controller, and (2) transmission of the input information of the entire certain group, which is executed when the input signal is received from each of the devices belonging to the certain group.

Therefore, in the master-slave control system including the slave apparatus having the above configuration, it is possible to (1) transmit the output signal to all the devices belonging to the certain group only by the controller transmitting the one output information to the slave apparatus having the above configuration. That is, an effect that the slave apparatus having the above configuration makes the transmission of the output signal to the device efficient as compared with the slave apparatus of the related art, and the controller can transmit an instruction to execute a desired process to the plurality of devices at a higher speed than in the related art is achieved.

Further, in the master-slave control system including the slave apparatus having the above configuration, it is possible to (2) execute a process corresponding to all the input signals of all the devices belonging to a certain group only by the controller receiving only one input information from the slave apparatus having the above configuration. That is, in the slave apparatus having the above configuration, an effect that the reception of the input signal by the controller is made efficient, and the controller can be caused to execute the process corresponding to the input signals of the plurality of devices at a higher speed than in the related art is achieved.

Further, the slave apparatus communicates with each of "the plurality of devices connected in series" via the single device communication port. Therefore, the slave apparatus also has excellent layout properties with respect to the device and wirings, as compared with the slave apparatus of the related art that communicates with each of the plurality of devices connected in parallel via the same number of communication ports as the number of the plurality of devices.

In the slave apparatus according to an aspect of the present invention, the plurality of devices may include one or more output devices that output a predetermined operation when receiving the output signal, and the device communication control unit may transmit the output signal indicating ON or OFF to all the output devices belonging to the certain group when the higher-level communication control unit has received one output information indicating ON or OFF from the controller from the controller.

With the above configuration, the relay apparatus can transmit the "additional information of each of the plurality of devices" received via the device communication port to the controller, and can transmit the output signal to the plurality of output devices belonging to the certain group, for example, when receiving the output information from the controller.

Therefore, an effect that the slave apparatus makes the transmission of the output signal to the device efficient as compared with a case in which a controller transmits the output signal to each of the plurality of output devices belonging to the certain group, and the controller can transmit an instruction to execute a desired process to the plurality of devices at a higher speed than in the related art is achieved.

In the slave apparatus according to an aspect of the present invention, in the grouping information, the plurality of devices may be divided into two or more groups.

With the above configuration, when (1) the higher-level communication control unit 120 receives, for example, output information having only the devices 30 belonging to the group A as a destination from the controller, the slave apparatus can transmit the output signal to all the devices belonging to the group A, and does not transmit the output signal to the devices belonging to group B. That is, an effect that the slave apparatus makes the transmission of the output signal to the device efficient for each group, and the controller can transmit an instruction to execute a desired process to the plurality of devices at a higher speed than in the related art is achieved.

Further, with the above configuration, (2) when the device communication control unit has received, for example, the input signals from each of the devices belonging to the group A, the slave apparatus can transmit input information for the entire group A to the controller, and does not transmit the input information corresponding to the entire group B. That is, since the slave apparatus arranges the input signals received from the plurality of devices for each group and transmits the resultant signal as the input information to the controller, an effect that the reception of the input signals by the controller can be made efficient, and the controller can be caused to execute the process corresponding to the input signals of the plurality of devices at a higher speed than in the related art is achieved.

In the slave apparatus according to an aspect of the present invention, the plurality of devices may include one or more input devices that detect stationary or non-stationary, and the higher-level communication control unit may transmit the one input information indicating stationary or non-stationary of the entire certain group to the controller when the device communication control unit has received the input signal indicating stationary or non-stationary from all the input devices belonging to the certain group.

With the above configuration, the slave apparatus receives "the additional information of each of the plurality of devices" via the single device communication port, transmits "the additional information of each of the plurality of devices 30" to the controller, and executes the following process. That is, when the slave apparatus receives an input signal indicating non-stationary from one or more input devices belonging to the certain group, the slave apparatus transmits the one input information indicating non-stationary of the certain group to the controller.

Therefore, an effect that since the slave apparatus arranges the information indicated by the input signals received from each of the plurality of input devices belonging to the certain group and transmits the resultant information to the controller as the input information, the reception of the input signal by the controller can be made efficient, and the controller can be caused to execute the process corresponding to the input signals of the plurality of devices at a higher speed than in the related art is achieved.

The slave apparatus according to an aspect of the present invention further includes a specifying unit that specifies at least one of an input device that has output the input signal indicating non-stationary and the group to which the input device that has output the input signal indicating non-stationary belongs when the device communication control unit receives the input signal indicating non-stationary from the input device, and the higher-level communication control unit transmits, to the controller, information indicating at least one of the input device and the group specified by the specifying unit.

With the above configuration, an effect that the slave apparatus can transmit at least one of information for specifying the input device that has output the input signal indicating non-stationary and information for specifying the group to which the input device that has output the input signal indicating non-stationary belongs, to the controller is achieved.

In the slave apparatus according to an aspect of the present invention, the controller may have a safety control function, and may execute a safety control operation when receiving input information indicating non-stationary.

With the above configuration, the controller has the safety control function, and executes the safety control operation (for example, a control operation for causing the driving apparatus to stop driving) when receiving the input information indicating non-stationary.

Here, for the safety control, when at least one of the plurality of devices outputs an input signal indicating "non-stationary", the controller needs to execute the above safety control operation such as causing the driving apparatus to stop driving. That is, for the safety control, it is not necessary to distinguish stationary and non-stationary of the input signals transmitted by each of the plurality of devices. When at least one device outputs an input signal indicating "non-stationary", the controller needs to execute the safety control operation.

An effect that with the relay apparatus, for example, one controller can receive the additional information of each of the plurality of devices, receive the input information corresponding to the information indicated by all of the input signals of each of the plurality of devices, and determine whether or not to execute the safety control operation is achieved.

In order to solve the above problems, a control method according to an aspect of the present invention is a method of controlling a slave apparatus connected to a controller that is a master apparatus, the method including: a device communication control step of communicating with a plurality of devices 30 respectively that are connected in series via a single communication port; and a higher-level communication control step of controlling communication with the controller. The slave apparatus includes a storage unit that stores grouping information that defines groups to which each of the plurality of devices belongs, additional information held by each of the plurality of devices received in the device communication control step is able to be transmitted to the controller in the higher-level communication control step, and the higher-level communication control step includes at least one of (1) transmission of an output signal indicating ON or OFF to all devices belonging to a certain group, which is executed in the device communication control step when one output information indicating ON or OFF is received from the controller in the higher-level communication control step, and (2) transmission of one input information indicating stationary or non-stationary of the entire certain group to the controller, which is executed in the higher-level communication control step when an input signal indicating stationary or non-stationary is received from each of the devices belonging to the certain group in the device communication control step.

According to the control method, it is possible to transmit "the additional information of each of the plurality of devices" received via the single communication port to the controller, and the following, at least one process is executed. That is, at least one of (1) transmission of the output signal indicating ON or OFF to all the devices belonging to a certain group, which is executed when the output information is received from the controller, and (2) transmission of one input information of the entire certain group to the controller, which is executed when the input signal is received from each of the devices 30 belonging to the certain group is executed.

Here, the slave apparatus of the related art includes a plurality of communication ports to which a plurality of input devices are respectively connected, and the plurality of input devices are connected in parallel to the plurality of communication ports and receives additional information and input signals of each of the plurality of devices. Therefore, as the number of input devices to be installed increases, it is necessary to add and prepare the same number of communication ports as the number of increased input devices, and costs related to facility investment thus tend to increase.

On the other hand, in the control method, "the additional information and the input signal of each of the plurality of devices" are received via the device communication port. Therefore, in the control method, an effect that the slave apparatus need only to include a single communication port for receiving "the additional information and the input signal of each of the plurality of devices", and costs for the communication port and the like can be suppressed as compared with the control method of the slave apparatus of the related art is achieved.

Further, in the master-slave control system of the related art, the master apparatus transmits (1) the output signal indicating ON or OFF to each of the plurality of devices, or receives (2) the input signal output by each of the plurality of devices.

On the other hand, in the above control method, at least one of (1) transmission of the output signal for all the devices belonging to the certain group, which is executed when the output information is received from the controller, and (2) transmission of the input information of the entire certain group, which is executed when the input signal is received from each of the devices belonging to the certain group is executed.

Therefore, in the control method, it is possible to (1) transmit the output signal to all the devices belonging to the certain group only by the controller transmitting the one output information to the slave apparatus having the above configuration. That is, in the control method, an effect that the transmission of the output signal to the device is made efficient, and the controller can transmit an instruction to execute a desired process to the plurality of devices at a higher speed than in the related art is achieved.

Further, in the control method, it is possible to (2) execute a process corresponding to all the input signals of all the devices belonging to the certain group only by the controller receiving only one input information from the slave apparatus having the above configuration. That is, in the control method, an effect that the reception of the input signal by the controller is made efficient, and the controller can be caused to execute the process corresponding to the input signals of the plurality of devices at a higher speed than in the related art is achieved.

In order to solve the above-mentioned problems, the master-slave control system according to an aspect of the present invention includes the slave apparatus and the controller.

With the above configuration, the master-slave control system can transmit the "additional information of each of the plurality of devices" received via a single communication port of the slave apparatus to the controller, and executes at least one of the following processes. That is, the master-slave control system executes at least one of (1) transmission of an output signal to all the devices belonging to the certain group, which is executed when the output information is received from the controller, and (2) transmission of the input information of the entire certain group, which is executed when the input signal is received from each of the devices belonging to the certain group.

Here, the slave apparatus of the related art includes a plurality of communication ports to which a plurality of input devices are respectively connected, and the plurality of input devices are connected in parallel to the plurality of communication ports and receives additional information and input signals of each of a plurality of devices. Therefore, as the number of input devices to be installed increases, it is necessary to add and prepare the same number of communication ports as the number of increased input devices, and costs related to facility investment thus tend to increase.

On the other hand, the slave apparatus in the master-slave control system receives "the additional information and the input signal of each of the plurality of devices" via the single device communication port. Therefore, an effect that in the master-slave control system, the slave apparatus need only include the single device communication port for receiving "the additional information and the input signal of each of the plurality of devices", and costs for the communication port or the like can be suppressed as compared with the master-slave control system is achieved.

Further, in the master-slave control system of the related art, the master apparatus transmits (1) the output signal indicating ON or OFF to the plurality of devices respectively, or receives (2) the input signal output by each of the plurality of devices.

On the other hand, the master-slave control system executes at least one of (1) transmission of an output signal to all the devices belonging to the certain group, which is executed when the output information is received from the controller, and (2) transmission of the input information of the entire certain group, which is executed when the input signal is received from each of the devices belonging to the certain group.

Therefore, in the master-slave control system, it is possible to (1) transmit the output signal to all the devices belonging to the certain group only by the controller transmitting the one output information to the slave apparatus having the above configuration. That is, in the master-slave control system, an effect that the transmission of the output signal to the device is made efficient, and the controller can transmit an instruction to execute a desired process to the plurality of devices at a higher speed than in the related art is achieved.

Further, in the master-slave control system, it is possible to (2) execute a process corresponding to all the input signals of all the devices belonging to the certain group only by the controller receiving only one input information from the slave apparatus having the above-described configuration. That is, the master-slave control system achieves an effect that the reception of the input signal by the controller is made efficient, and the controller can be caused to execute the process corresponding to the input signals of the plurality of devices at a higher speed than in the related art.

In the master-slave control system according to an aspect of the present invention, when the controller does not receive the input information indicating stationary from the slave apparatus in response to a request for input information sent to the slave apparatus, the controller may execute a predetermined control operation.

With the above configuration, when the controller does not receive the input information indicating stationary from the slave apparatus in response to the request for input information sent to the slave apparatus, the controller executes the predetermined control operation. That is, (1) when the controller does not receive the input information indicating non-stationary from the slave apparatus in response to the request for input information sent to the slave apparatus, the controller executes the predetermined control operation.

Further, (2) when the controller does not receive the input information itself from the slave apparatus in response to the request for input information sent to the slave apparatus, the controller executes the predetermined control operation. For example, when the controller does not receive the input information itself from the slave apparatus in response to the request for input information due to occurrence of an event such as a failure in the slave apparatus itself or occurrence of abnormality or the like in a communication path, the controller executes the predetermined control operation.

Therefore, an effect that, when the master-slave control system confirms safety, for example, by the controller receiving the input information indicating stationary, the master-slave control system can execute a predetermined control operation such as causing the driving apparatus to stop driving (1) when the controller has received the input information indicating non-stationary or (2) when the controller cannot receive the input information itself and cannot confirm the safety is achieved.

In the master-slave control system according to an aspect of the present invention, the controller may be a slave apparatus in the higher-level master-slave control system, and the controller may transmit the additional information to the higher-level master apparatus that manages data transfer in the higher-level master-slave control system.

With the above configuration, an effect that the controller can transmit the additional information to the higher-level master apparatus in the higher-level master-slave control system is achieved.

The non-transitory recording medium that records an information processing program according to an aspect of the present invention is computer-readable recording medium that records an information processing program for causing a computer including a communication port to which communication cables for communicating with a plurality of devices connected in series are connected to function as the slave apparatus according to an aspect of the present invention, and causes the computer to function as each unit.

With the above configuration, an effect that the information processing program can cause the computer to function as the slave apparatus according to an aspect of the present invention is achieved.

The present invention is not limited to the above-described embodiments, and various modifications can be made within the scope defined in the claims. Embodiments obtained by appropriately combining the technical means disclosed in the different embodiments are also included in the technical scope of the present invention.

What is claimed is:

1. A slave apparatus connected to a controller that is a master apparatus in a factory automation (FA) system, the slave apparatus comprising:

a device communication control unit that communicates with a plurality of devices respectively that are connected in series via a single communication port;
a higher-level communication control unit that controls communication with the controller; and
a storage unit that stores grouping information that define groups to which each of the plurality of devices belongs,
wherein the higher-level communication control unit is able to transmit, to the controller, additional information held by each of the plurality of devices received by the device communication control unit,
the plurality of devices includes at least one output device that outputs a predetermined operation when receiving the output signal, and
when the higher-level communication control unit receives one output information indicating ON or OFF from the controller, the device communication control unit transmits an output signal indicating ON or OFF to all devices that belong to a certain group, but does not transmit the output signal to devices that do not belong to the certain group, and causes all the devices that belong to the certain group output the predetermined operation,
when the device communication control unit receives an input signal indicating stationary respectively from all the devices that belong to the certain group, the higher-level communication control unit transmits one input information indicating an entirety of the certain group is stationary to the controller, and
when the device communication control unit receives an input signal indicating non-stationary from at least one of the devices that belong to the certain group, the higher-level communication control unit transmits one input information indicating that the entirety of the certain group is non-stationary to the controller.

2. The slave apparatus according to claim 1, wherein in the grouping information, the plurality of devices is divided into two or more groups.

3. The slave apparatus according to claim 1, wherein the controller has a safety control function, and executes a safety control operation when receiving the input information indicating non-stationary.

4. A master-slave control system comprising the slave apparatus according to claim 1, and the controller.

5. The master-slave control system according to claim 4, wherein in the grouping information, the plurality of devices is divided into two or more groups.

6. The slave apparatus according to claim 4, wherein the controller has a safety control function, and executes a safety control operation when receiving the input information indicating non-stationary.

7. The master-slave control system according to claim 4, wherein when the controller does not receive the input information indicating stationary from the slave apparatus in response to a request for input information sent to the slave apparatus, the controller executes a predetermined control operation.

8. The master-slave control system according to claim 7, wherein the controller is a slave apparatus in a higher-level master-slave control system, and the controller transmits the additional information to a higher-level master apparatus that manages data transfer in the higher-level master-slave control system.

9. The master-slave control system according to claim 4, wherein the controller is a slave apparatus in a higher-level master-slave control system, and the controller transmits the additional information to a higher-level master apparatus that manages data transfer in the higher-level master-slave control system.

10. A non-transitory recording medium that records an information processing program for causing a computer including a communication port to which communication cables for communicating with a plurality of devices connected in series are connected to function as the slave apparatus according to claim 1, wherein the information processing program causes the computer to function as each of the device communication control unit, the higher-level communication control unit and the storage unit.

11. The non-transitory recording medium according to claim 10, wherein in the grouping information, the plurality of devices is divided into two or more groups.

12. The non-transitory recording medium according to claim 10, wherein the controller has a safety control function, and executes a safety control operation when receiving the input information indicating non-stationary.

13. A method of controlling a slave apparatus connected to a controller that is a master apparatus in a factory automation (FA) system, the slave apparatus including a device communication control unit and a higher-level communication control unit, the method comprising:
a device communication control step of communicating with a plurality of devices respectively that are connected in series via a single communication port of the device communication control unit; and
a higher-level communication control step of controlling communication with the controller,
wherein the slave apparatus includes a storage unit that stores grouping information that defines groups to which each of the plurality of devices belongs,
in the higher-level communication control step, additional information held by each of the plurality of devices received in the device communication control step is able to be transmitted to the controller, and
wherein the plurality of devices includes at least one output device that outputs a predetermined operation when receiving the output signal, and
when one output information indicating ON or OFF is received from the controller in the higher-level communication control step, an output signal indicating ON or OFF is transmitted to all devices that belong to a certain group, but not transmitted the output signal to devices that do not belong to the certain group, and causes all the devices that belong to the certain group output the predetermined operation in the device communication control step,
when the device communication control unit receives an input signal indicating stationary respectively from all the devices that belong to the certain group, the higher-level communication control unit transmits one input information indicating an entirety of the certain group is stationary to the controller, and
when the device communication control unit receives an input signal indicating non-stationary from at least one of the devices that belong to the certain group, the higher-level communication control unit transmits one input information indicating that the entirety of the certain group is non-stationary to the controller.

* * * * *